(12) United States Patent
Gu et al.

(10) Patent No.: US 12,164,593 B2
(45) Date of Patent: *Dec. 10, 2024

(54) DATAFLOW ACCELERATOR ARCHITECTURE FOR GENERAL MATRIX-MATRIX MULTIPLICATION AND TENSOR COMPUTATION IN DEEP LEARNING

(71) Applicant: Samsung Electronics Co., Ltd., Suwon-si (KR)

(72) Inventors: Peng Gu, Santa Barbara, CA (US); Krishna Malladi, San Jose, CA (US); Hongzhong Zheng, Los Gatos, CA (US); Dimin Niu, Sunnyvale, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 22 days.

This patent is subject to a terminal disclaimer.

(21) Appl. No.: 17/374,988

(22) Filed: Jul. 13, 2021

(65) Prior Publication Data

US 2021/0374210 A1 Dec. 2, 2021

Related U.S. Application Data

(63) Continuation of application No. 16/388,860, filed on Apr. 18, 2019, now Pat. No. 11,100,193.

(Continued)

(51) Int. Cl.
*G06F 17/16* (2006.01)
*G06F 12/0802* (2016.01)
(Continued)

(52) U.S. Cl.
CPC .......... *G06F 17/16* (2013.01); *G06F 12/0802* (2013.01); *G06F 12/0877* (2013.01);
(Continued)

(58) Field of Classification Search
CPC ................. G06F 17/16; G06F 12/0877; G06F 2212/1024; G06F 12/0207; G06F 12/0292;
(Continued)

(56) References Cited

U.S. PATENT DOCUMENTS 5,506,797 A 4/1996 Koshiba
7,532,785 B1 5/2009 Beausoleil et al.
(Continued)

FOREIGN PATENT DOCUMENTS

CN 104238993 A 12/2014
CN 108805283 A 11/2018
(Continued)

OTHER PUBLICATIONS

Final Office Action for U.S. Appl. No. 16/388,863, mailed Dec. 12, 2022.
(Continued)

*Primary Examiner* — Tan V Mai
(74) *Attorney, Agent, or Firm* — Renaissance IP Law Group LLP

(57) ABSTRACT

A general matrix-matrix multiplication (GEMM) dataflow accelerator circuit is disclosed that includes a smart 3D stacking DRAM architecture. The accelerator circuit includes a memory bank, a peripheral lookup table stored in the memory bank, and a first vector buffer to store a first vector that is used as a row address into the lookup table. The circuit includes a second vector buffer to store a second vector that is used as a column address into the lookup table, and lookup table buffers to receive and store lookup table entries from the lookup table. The circuit further includes adders to sum the first product and a second product, and an output buffer to store the sum. The lookup table buffers determine a product of the first vector and the second vector
(Continued)

without performing a multiply operation. The embodiments include a hierarchical lookup architecture to reduce latency. Accumulation results are propagated in a systolic manner.

20 Claims, 19 Drawing Sheets

Related U.S. Application Data

(60) Provisional application No. 62/777,046, filed on Dec. 7, 2018.

(51) Int. Cl.
*G06F 12/0877* (2016.01)
*G06N 3/008* (2023.01)
*G06N 3/045* (2023.01)
*G06N 3/063* (2023.01)
*G06N 3/08* (2023.01)

(52) U.S. Cl.
CPC ............ *G06N 3/008* (2013.01); *G06N 3/045* (2023.01); *G06N 3/063* (2013.01); *G06F 2212/1024* (2013.01); *G06F 2212/1036* (2013.01); *G06F 2212/22* (2013.01); *G06N 3/08* (2013.01)

(58) Field of Classification Search
CPC ............ G06F 15/7821; G06F 15/8046; G06F 9/3867; G06N 3/045; G06N 3/063; G06N 3/08; G06N 3/084; H10B 12/00
USPC ......................................................... 708/190
See application file for complete search history.

(56) References Cited

U.S. PATENT DOCUMENTS

| | | |
|---|---|---|
| 9,384,168 B2 | 7/2016 | Mortensen |
| 9,779,786 B1 | 10/2017 | Wu et al. |
| 9,922,696 B1 | 3/2018 | Li et al. |
| 10,049,322 B2 | 8/2018 | Ross |
| 10,346,093 B1 | 7/2019 | Wu et al. |
| 10,643,297 B2 | 5/2020 | Mellempudi et al. |
| 11,100,193 B2 | 8/2021 | Gu et al. |
| 11,164,074 B2 | 11/2021 | Franca-Neto |
| 11,281,966 B2 | 3/2022 | Ross |
| 11,373,088 B2 | 6/2022 | Bleiweiss et al. |
| 11,424,539 B2 | 8/2022 | Alpman et al. |
| 11,501,152 B2 | 11/2022 | Yehezkel Rohekar et al. |
| 2009/0030960 A1 | 1/2009 | Geraghty et al. |
| 2011/0307233 A1 | 12/2011 | Tseng et al. |
| 2011/0314252 A1 | 12/2011 | Lundqvist |
| 2012/0215826 A1 | 8/2012 | Hansen et al. |
| 2014/0207794 A1 | 7/2014 | Du et al. |
| 2014/0289445 A1 | 9/2014 | Savich |
| 2017/0149458 A1* | 5/2017 | Ota .................. H04B 1/0475 |
| 2017/0206033 A1 | 7/2017 | Ma et al. |
| 2018/0075339 A1 | 3/2018 | Ma et al. |
| 2018/0152317 A1 | 5/2018 | Chang et al. |
| 2018/0157465 A1 | 6/2018 | Bittner et al. |
| 2018/0189234 A1 | 7/2018 | Nurvitadhi et al. |
| 2018/0189239 A1 | 7/2018 | Nurvitadhi et al. |
| 2018/0253402 A1 | 9/2018 | Redfern et al. |
| 2018/0314941 A1 | 11/2018 | Lie et al. |
| 2018/0315158 A1 | 11/2018 | Nurvitadhi et al. |
| 2018/0322606 A1 | 11/2018 | Das et al. |
| 2019/0042250 A1 | 2/2019 | Anders et al. |
| 2019/0051642 A1 | 2/2019 | Gupta et al. |
| 2019/0139182 A1 | 5/2019 | Nurvitadhi et al. |
| 2019/0196953 A1* | 6/2019 | Gu .................. G06F 9/3004 |
| 2019/0205132 A1* | 7/2019 | Bui .................. G06F 9/30036 |
| 2019/0311243 A1 | 10/2019 | Whatmough et al. |
| 2019/0392297 A1 | 12/2019 | Lau et al. |
| 2021/0192328 A1 | 6/2021 | Ross |

FOREIGN PATENT DOCUMENTS

| | | | |
|---|---|---|---|
| CN | 108805796 | A | 11/2018 |
| CN | 111144545 | A | 5/2020 |
| IN | 108805792 | A | 11/2018 |
| JP | H03182171 | A | 8/1991 |
| JP | H07248841 | A | 9/1995 |
| JP | 2009516248 | A | 4/2009 |
| JP | 2011501238 | A | 1/2011 |
| JP | 2012064087 | A | 3/2012 |
| JP | 2018521374 | A | 8/2018 |
| KR | 20170126999 | A | 11/2017 |
| KR | 20190089955 | A | 7/2019 |
| KR | 20200070089 | A | 6/2020 |
| TW | 201214176 | A | 4/2012 |
| WO | 2017171769 | A1 | 10/2017 |
| WO | 2018126073 | A1 | 7/2018 |

OTHER PUBLICATIONS

Anarado, Ijeoma et al., "Highly-Reliable Integer Matrix Multiplication Via Numerical Packing," InOn-Line Testing Symposium (IOLTS), 2013 IEEE 19th International 2013, Jul. 8, 2013, 6 pages.
Animesh, Saurabh, "Algorithm Architecture Co-Design for Dense and Sparse Matrix Computations", Arizona State University, ProQuest Dissertations Publishing, ProQuest LLC, Dec. 2018, 80 pages.
Gan, Yiming, "Hardware Acceleration for Tensorized Neural Network," ProQuest Dissertations & Theses Global: The Sciences and Engineering Collection, Mar. 2018, 24 pages.
Kim, Nam Sung et al., "Heterogeneous Computing Meets Near-Memory Acceleration and High-Level Synthesis in the Post-Moore Era", IEEE Computer Society, IEEE Micro vol. 37, Issue 4, Aug. 2017, 8 pages.
Notice of Allowance for U.S. Appl. No. 16/388,860, mailed Apr. 21, 2021.
Quayle Action for U.S. Appl. No. 16/388,860, mailed Feb. 9, 2021.
Savich, Antony et al., "A Low-Power Scalable Stream Compute Accelerator for General Matrix Multiply (GEMM)," VLSI Design, vol. 2014, Article ID 712085, https://doi.org/10.1155/2014/7120852014, 2014, 12 pages.
Schuiki, Fablan et al., "A Scalable Near-Memory Architecture for Training Deep Neural Networks on Large In-Memory Datasets", IEEE Transactions on Computers, Feb. 2018, 14 pages.
Song, Linghao et al., "PipeLayer: A Pipelined ReRAM-Based Accelerator for Deep Learning", 2017 IEEE International Symposium on High Performance Computer Architecture (HPCA), 2017, 13 pages.
Gao, Mingyu et al., "TETRIS: Scalable and Efficient Neural Network Acceleration with 3D Memory," ASPLOS '17: Proceedings of the Twenty-Second International Conference on Architectural Support for Programming Languages and Operating Systems, 2017, 14 pages.
Kim, Dongyoung et al., "A Novel Zero Weight/Activation-Aware Hardware Architecture of Convolutional Neural Network," Design, Automation & Test in Europe Conference & Exhibition 2017, pp. 1462-1467.
Office Action for U.S. Appl. No. 16/388,863, mailed Jul. 25, 2022.
Office Action for U.S. Appl. No. 16/388,863, mailed Aug. 29, 2023.
Final Office Action for U.S. Appl. No. 16/388,863, mailed Mar. 27, 2024.
Office Action for U.S. Appl. No. 16/388,863, mailed Sep. 28, 2024.

* cited by examiner

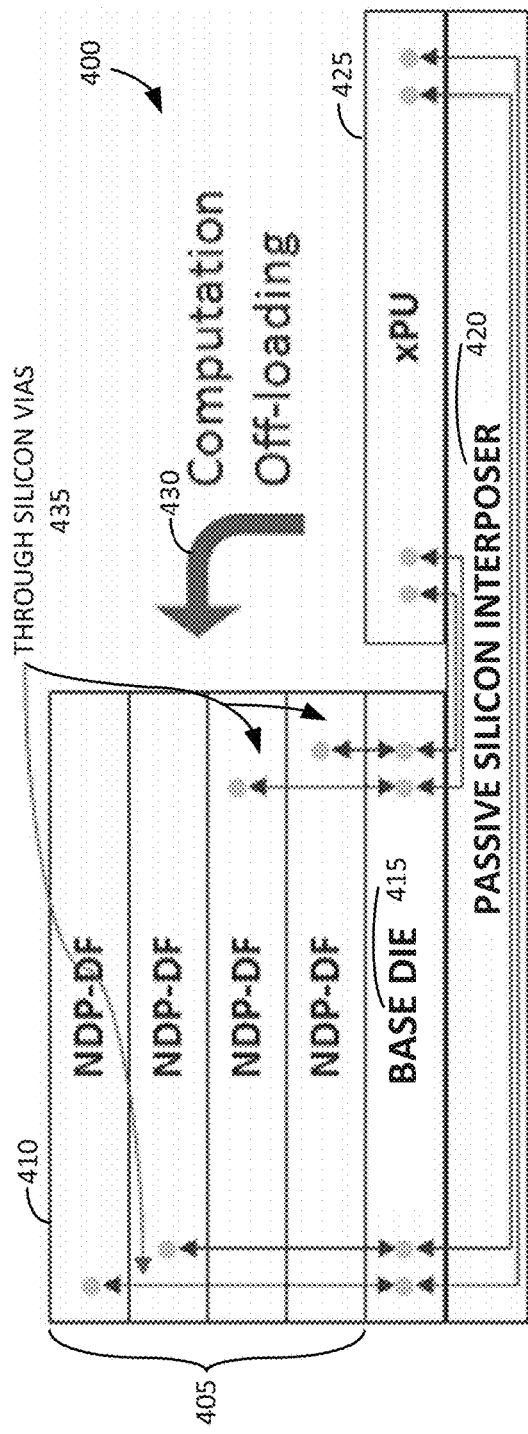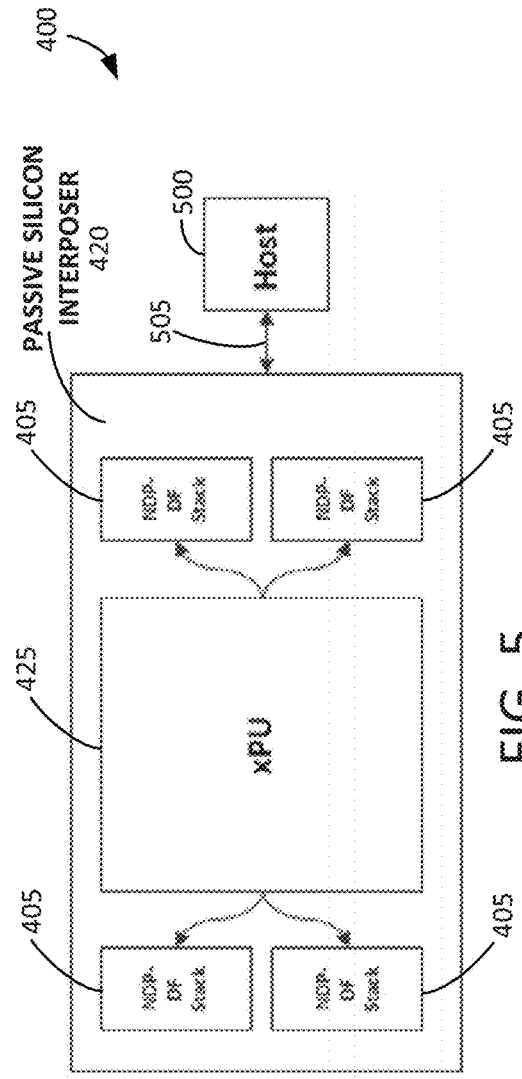

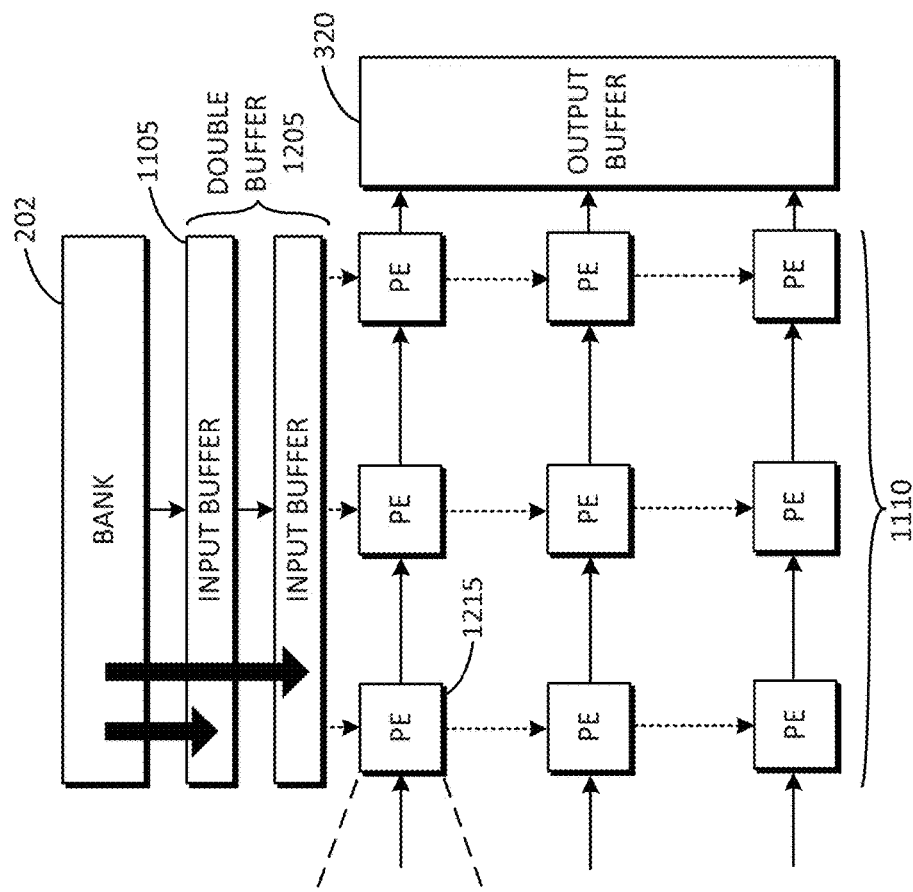
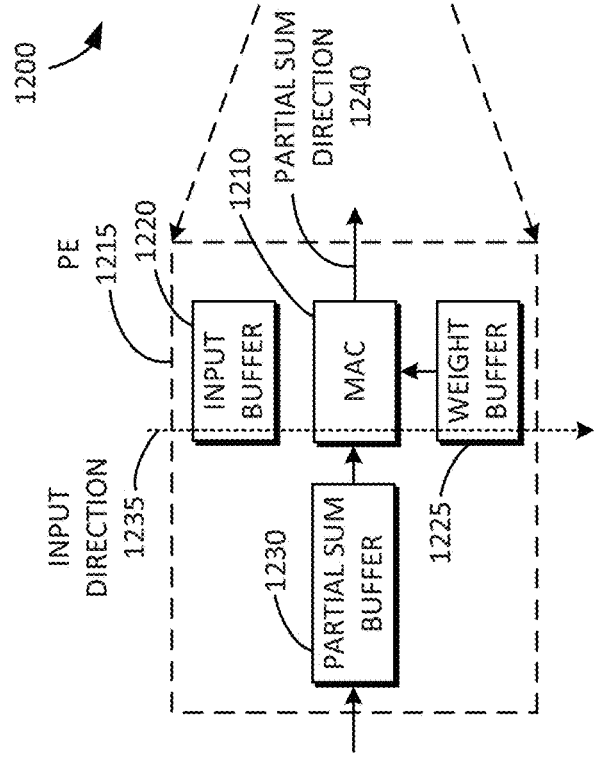
FIG. 12
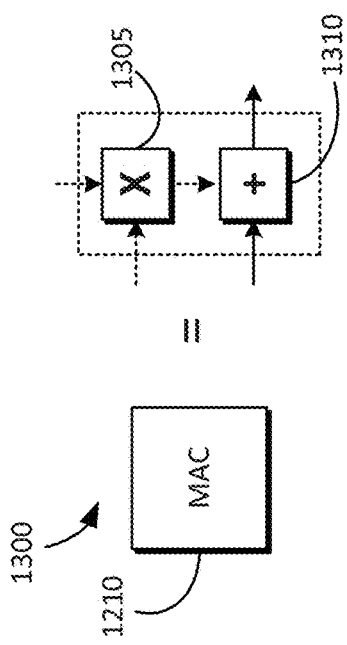
FIG. 13

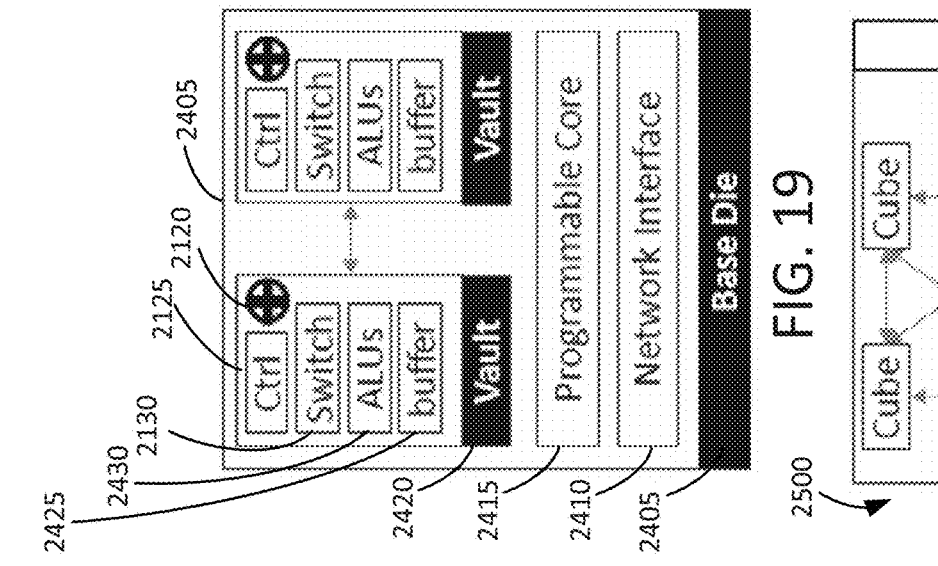
FIG. 19
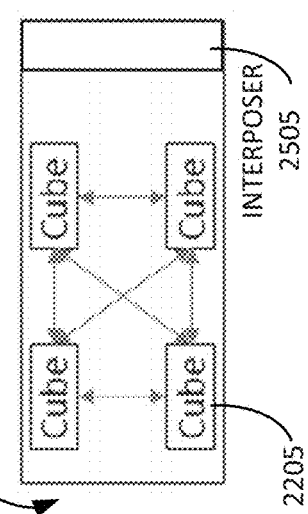
FIG. 20
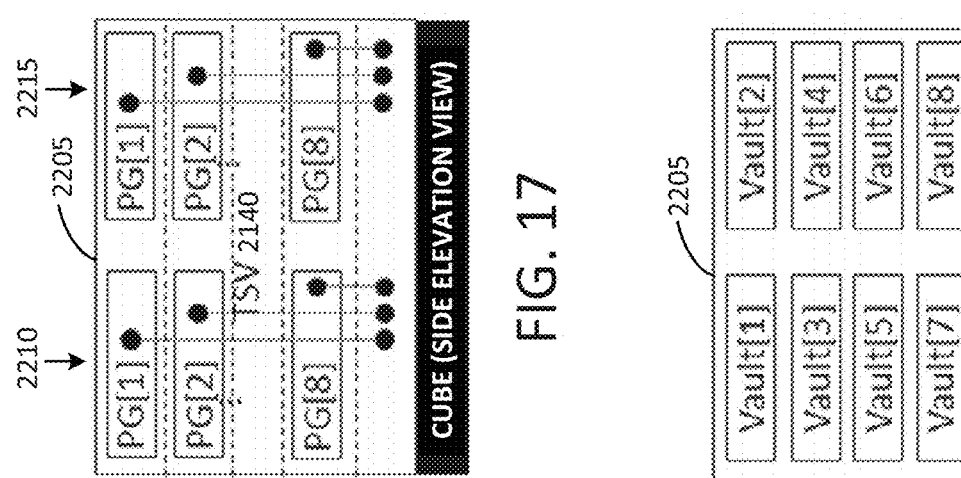
FIG. 17
FIG. 18
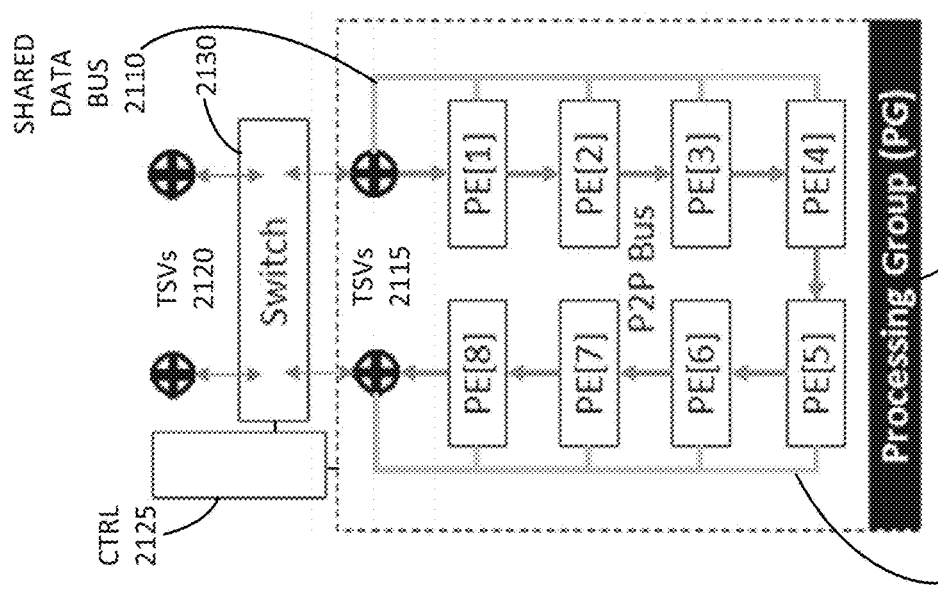
FIG. 16

DATAFLOW ACCELERATOR ARCHITECTURE FOR GENERAL MATRIX-MATRIX MULTIPLICATION AND TENSOR COMPUTATION IN DEEP LEARNING

RELATED APPLICATION DATA

This application is a continuation of U.S. patent application Ser. No. 16/388,860, filed Apr. 18, 2019, which claims the benefit of U.S. Patent Application Ser. No. 62/777,046, filed Dec. 7, 2018, which is hereby incorporated by reference.

BACKGROUND

The present inventive concepts relate to deep learning, and more particularly, to a dataflow accelerator architecture for general matrix-matrix multiplication and tensor computation in deep learning.

Deep neural networks are considered as a promising approach to realizing artificial intelligence, and have demonstrated their effectiveness in a number of applications. Training deep neural network requires both high precision and wide dynamic range, which demand efficient floating point operations. Tensor computation, which includes the majority of floating point operations and contributes the most time in training deep neural networks, is a key primitive operation for acceleration. Compute-centric accelerators for tensor computation suffer from a "memory wall" issue, since computation performance scales much faster than memory bandwidth and latency, and off-chip data movement consumes two orders greater magnitude of energy than a floating point operation.

Tensor computation plays an important role across a wide spectrum of applications in deep learning. Process-in-memory (PIM) architectures, which enable computation capability inside or near the memory module, have demonstrated the potential to accelerate tensor computation owing to its large internal bandwidth, reduction in date movement, and massive memory parallelism. However, conventional PIM approaches mainly explore deep learning inference applications, which may tolerate reduced precision, but may also be incapable of complex floating point training tasks. Near-Data-Processing (NDP) architecture is less intrusive and places complex Arithmetic Logic Units (ALUs) outside of a memory core bank. However, the number of ALUs is strictly confined due to area budget, and NDP approaches also lose a significant amount of internal bandwidth compared with compute-centric architectures. These shortcomings make NDP architectures less effective in floating point performance compared with compute-centric approaches.

Moreover, simply adding floating points units to satisfy the computational demands of tensor processing results in significant and unacceptable area overhead in a DRAM die. In addition, emerging non-volatile memory based accelerators suffer from poor write endurance and long write latency, which are unsuitable for write-intensive deep learning training tasks. Furthermore, static random-access memory (SRAM)-based accelerators do not have enough on-chip memory capacity to store all of the model parameters and intermediate results needed for deep learning training.

BRIEF SUMMARY

Inventive concepts disclosed herein include a general matrix-matrix multiplication (GEMM) dataflow accelerator semiconductor circuit that includes a smart 3D stacking DRAM architecture. The GEMM dataflow accelerator circuit includes a memory bank, a peripheral lookup table stored in the memory bank, and a first vector buffer to store a first vector which is used as a row address to the lookup table. The GEMM dataflow accelerator circuit may further include lookup table buffers to receive and store lookup table entries as cached copies from the full lookup table in the memory bank. The GEMM dataflow accelerator circuit further includes a second vector buffer configured to store a second vector which is used as a column address to the lookup table, and to stream the second vector to the lookup table buffers. The GEMM dataflow accelerator semiconductor circuit further includes adders to sum the first product and a second product, and an output buffer to store a result of the sum. The lookup table buffers determine an outer product of the first vector and the second vector without performing a multiply operation. The disclosed embodiments include a hierarchical lookup architecture to reduce latency. Accumulation results are propagated in a systolic manner.

BRIEF DESCRIPTION OF THE DRAWINGS

The foregoing and additional features and advantages of the present inventive principles will become more readily apparent from the following detailed description, made with reference to the accompanying figures, in which:

FIG. 4 is an example block diagram showing a side elevation view of an integrated stack dataflow accelerator in accordance with some embodiments disclosed herein.

FIG. 5 is an example block diagram showing a plan view of the integrated stack dataflow accelerator in accordance with some embodiments disclosed herein.

FIG. 12 is an example block diagram of a tensor computation dataflow accelerator in accordance with some embodiments disclosed herein.

FIG. 13 is an example block diagram a MAC unit.

FIG. 16 is an example block diagram of a microarchitecture of a PG of a tensor computation dataflow accelerator in accordance with some embodiments disclosed herein.

FIG. 17 is an example side elevation view of a cube of PGs of a tensor computation dataflow accelerator in accordance with some embodiments disclosed herein.

FIG. 18 is an example plan view of the cube of PGs of a tensor computation dataflow accelerator including multiple vaults of PGs in accordance with some embodiments disclosed herein.

FIG. 19 is an example diagram of a base die of a tensor computation dataflow accelerator in accordance with some embodiments disclosed herein.

FIG. 20 is an example block diagram of a tensor computation dataflow accelerator including a passive silicon interposer, and multiple cubes disposed thereon in accordance with some embodiments disclosed herein.

DETAILED DESCRIPTION

Figure 1:
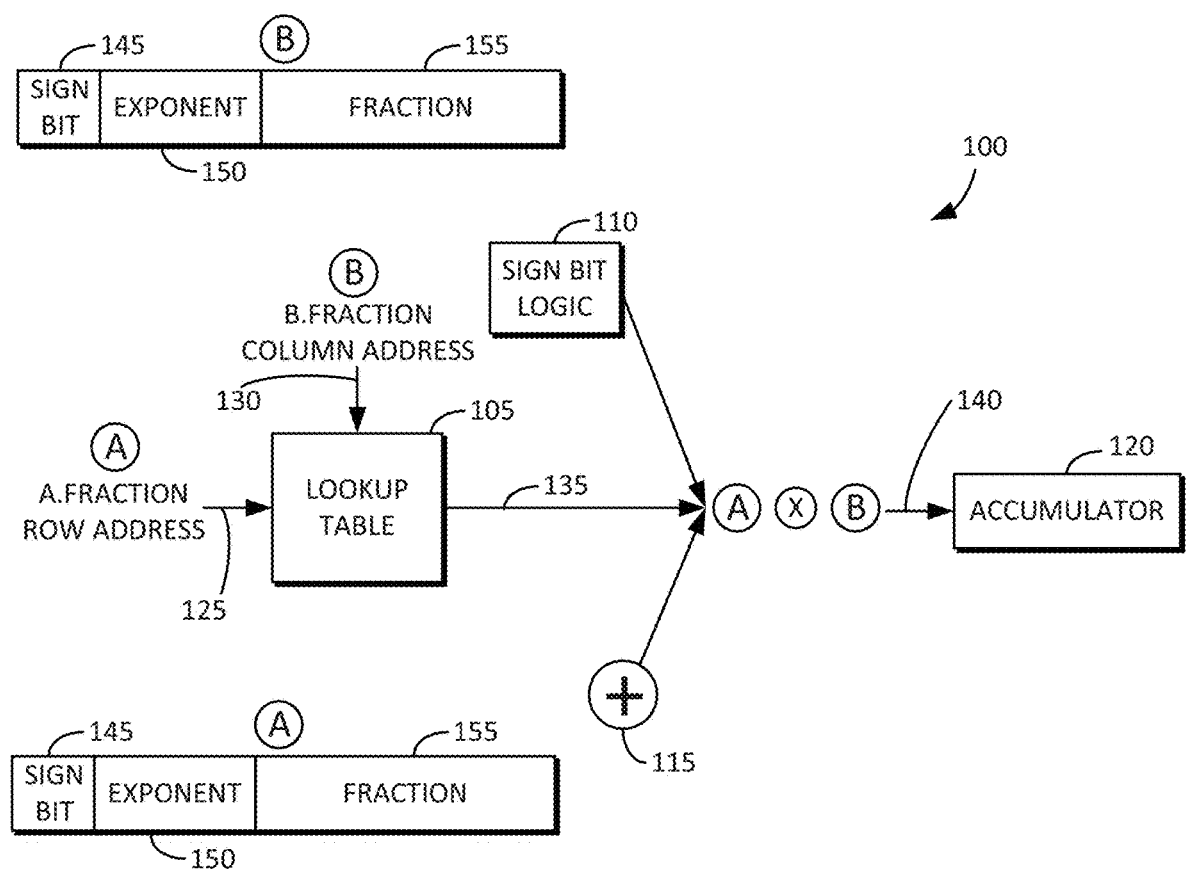
FIG. 1 is an example block and flow diagram of a scalar multiply-and-accumulate operation using a lookup table in accordance with some embodiments disclosed herein.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first stack could be termed a second stack, and, similarly, a second stack could be termed a first stack, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

The present disclosure relates to a dataflow accelerator architecture for general matrix-matrix multiplication (GEMM) and tensor computation in deep learning. Embodiments disclosed herein transform floating point scalar-vector multiplications into concurrent lookup operations in a dynamic random access memory (DRAM)-based lookup table, and add all peripheral logic support outside of a DRAM core bank. Accordingly, less area is consumed and shorter latency is achieved relative to purely adding floating point multiplication units. Embodiments disclosed herein are more practical than in-situ analog PIM units, which require significant modification of memory sensing circuits. To reduce the number of row activation during table lookup, the peripheral logic may employ one or more lookup table buffers to cache lookup results, and the disclosed data mapping yields an extremely high buffer hit rate in batched deep learning training tasks. The disclosed mapping also guarantees that input tensors come from a local DRAM bank, thus fully utilizing the bank raw internal bandwidth for read traffic. To improve scalability and write traffic, a systolic-array dataflow architecture is disclosed, which scales tensor computations across multiple banks and channels, such that adjacent banks or channels work in a producer-consumer pipelined fashion, and data may be written into a bank only at the final stage. To support sparse tensor computation, zero-skipping logic may be used.

Embodiments disclosed herein implement multipliers using a memory lookup table (LUT), where the multiplier may be used as the row address, and the multiplicand may be used as the column address. The width of the LUT can be contained within a bank, and can be efficiently stored and accessed in DRAM subarrays. In order to reduce the DRAM LUT row activations, which are both power and time consuming, LUT buffers may be added in the bank peripheral circuit, and a general matrix-multiplication (GEMM) tiling technique may be used to increase the reuse of the lookup results in the LUT buffers. To improve the throughput, a lookup-based tensor outer-product engine (PE) may be used. Each buffer may be divided into several segments, each of which can serve one independent value-based lookup. Accumulators may also be included in the bank peripheral to aggregate a partial sum in a time-multiplexed technique. To avoid write-back and re-load partial sums, a systolic dataflow architecture may be employed, where a previous bank's accumulators may transfer their current partial sum for a next bank's accumulation, and a last bank may relay its results to other channels. Through-silicon-vias (TSVs) in 3D stacking may be used to provide high inter-channel data transfer bandwidth. The disclosed GEMM block mapping technique can distribute input tensors of arbitrary sizes across all banks in the same dataflow group. Since input partial tensors and the LUT are all local to the bank, a wide bank interface (e.g., 256 bits) to access tensor may be used, and row-clone citation to access an entire row of the LUT in one cycle may be used.

Accordingly, a DRAM-based lookup-table may be used together with a near-memory dataflow architecture to accelerate floating point tensor computation in deep learning, thereby increasing bandwidth scalability benefits compared with a compute-centric approach. Lookup-in-memory dataflow tensor computation is supported. Outer-product based GEMM block mapping that uses bank internal bandwidth reduces row activations and increases bandwidth scalability.

Embodiments disclosed herein may include a 3D-stacking DRAM-based accelerator, which has abundant on-chip memory capacity, symmetric read/write performance, and is free of write endurance issues. The 3D-stacking can increase density of memory and computation, and provide high-bandwidth inter-die communication. Since the majority area of the floating point multiplier is dominated by a fraction multiplier, the entire fraction multiplication table may be stored in one DRAM bank with negligible capacity overhead. Parallel multiplications may be turned into parallel lookup computations. One bank may be transformed into one PE by adding a peripheral circuit beside each bank to mitigate lookup overhead and increase the performance of the PE. The disclosed data mapping technique guarantees all read traffic is local to each bank to shorten data movement distance, and also uses bank-level read bandwidth. The bank-level circuit and microarchitecture details are disclosed herein. To increase data reuse before writing them back, a systolic dataflow architecture may be used for multiple banks within a channel, where the partial results are propagated to the neighboring banks for accumulation. To maintain smooth dataflow and maximize the utilization of each bank, an efficient data-feeding technique may be used for neural network inter-layer data movement. For more general neural network training, one or more general-purpose ALUs may be disposed on a base die of the 3D stack to realize important but not time-consuming operations like batch-normalization, activation, and pooling. The die and stack-level architecture details are also disclosed herein. Also disclosed is a scalable technique to formulate arbitrary sized matrix multiplication and convolution operations into vector-outer-product operations, to use pipeline parallelism and data parallelism programming to decide data mapping, and to schedule the computation. Also disclosed is a new architecture and controller design for the accelerator. The controller, computation scheduling, whole application data mapping, and system integration aspects are also disclosed herein.

FIG. 1 is an example block diagram of a scalar floating point multiply-and-accumulate engine 100 using a lookup table in accordance with some embodiments disclosed herein. The floating point multiply-and-accumulate engine 100 may include a lookup table 105, sign bit logic 110, an adder circuit 115, and an accumulator 120. The lookup table 105 may receive an A-fraction 155 row address at 125 and a B-fraction 155 column address at 130. In other words, the value of the A-fraction 155 is used as a row address into the lookup table 105, and the value of the B-fraction 155 is used as a column address into the lookup table 105. Accordingly, a partial product multiplier as conventionally used is no longer needed. A significant amount of die area is therefore saved. An output 135 from the lookup table 105 is combined with the A-sign bit 145 and the B-sign bit 145 as determined by the sign bit logic 110. The sign bits (e.g., A-sign bit 145 and B-sign bit 145) indicate the sign of the multiplication result. The adder circuit 115 may add exponents associated with the A-fraction and the B-fraction (e.g., A-exponent 150 and B-exponent 150). The product 140 of the multiplication operation may be accumulated by the accumulator 120. In some embodiments, the product 140 is an eleven bit value. The lookup table 105 may be a DRAM-based lookup table. The DRAM-based lookup table 105 may be used to implement a vector outer-product. In some embodiments, the size of the DRAM-based lookup table 150 is 16 Mb.

Peripheral logic may be included outside of a DRAM bank such that the DRAM core need not be changed. Compared with using multiply-and-add (MAC) units outside of the DRAM bank, the DRAM-based lookup table 105 saves significant area and processing overhead. Moreover, compared with NDP on a base logic die, the DRAM-based lookup table 105 provides higher internal bandwidth (e.g., bank-level bandwidth) and higher computation performance. Accordingly, floating point tensor multiplication is supported in Process-in-Memory (PIM) architectures using the lookup table 105.

Figure 2:
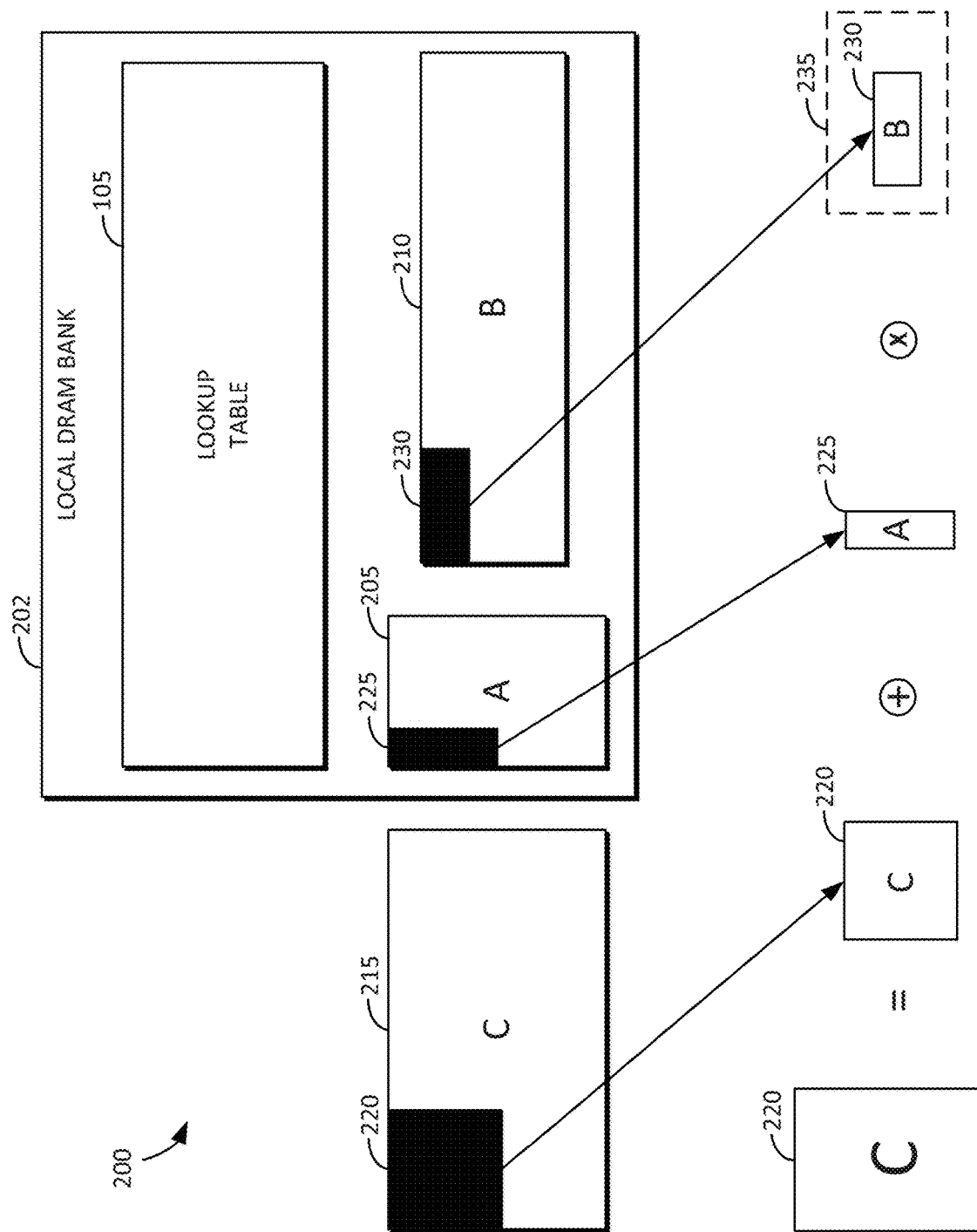
FIG. 2 is an example block diagram showing a local DRAM bank including a full lookup table and associated input matrices for the computation in accordance with some embodiments disclosed herein.

FIG. 2 is an example block diagram 200 showing a local DRAM bank 202 including a full lookup table 105 in accordance with some embodiments disclosed herein. The lookup table 105 may include the product results of all possible combinations of two integers. The two integers have the same bit length, which is equal to the length of the fraction part of a floating point number. The A-entry 225 and the B-entry 230 may be stored in local DRAM banks (e.g., 202), and the C-entry 220 may be propagated and accumulated among different PEs. The final PE in the chain may cause the accumulated C-entry 220 to be stored back to the local DRAM bank (e.g., 202). The A-entry 225 may be streamed directly from the local DRAM bank 202, thereby using the DRAM row buffer and high bank read bandwidth. The B-entry 230 may include one or more weights, and may be used as a row address for accessing the full lookup table 105 from the local bank 202. The results of the full lookup table 105 may be temporarily stationary in a lookup table buffer 235 while the A-entry 225 is streamed from the local DRAM bank 202, as further explained below.

Figure 3:
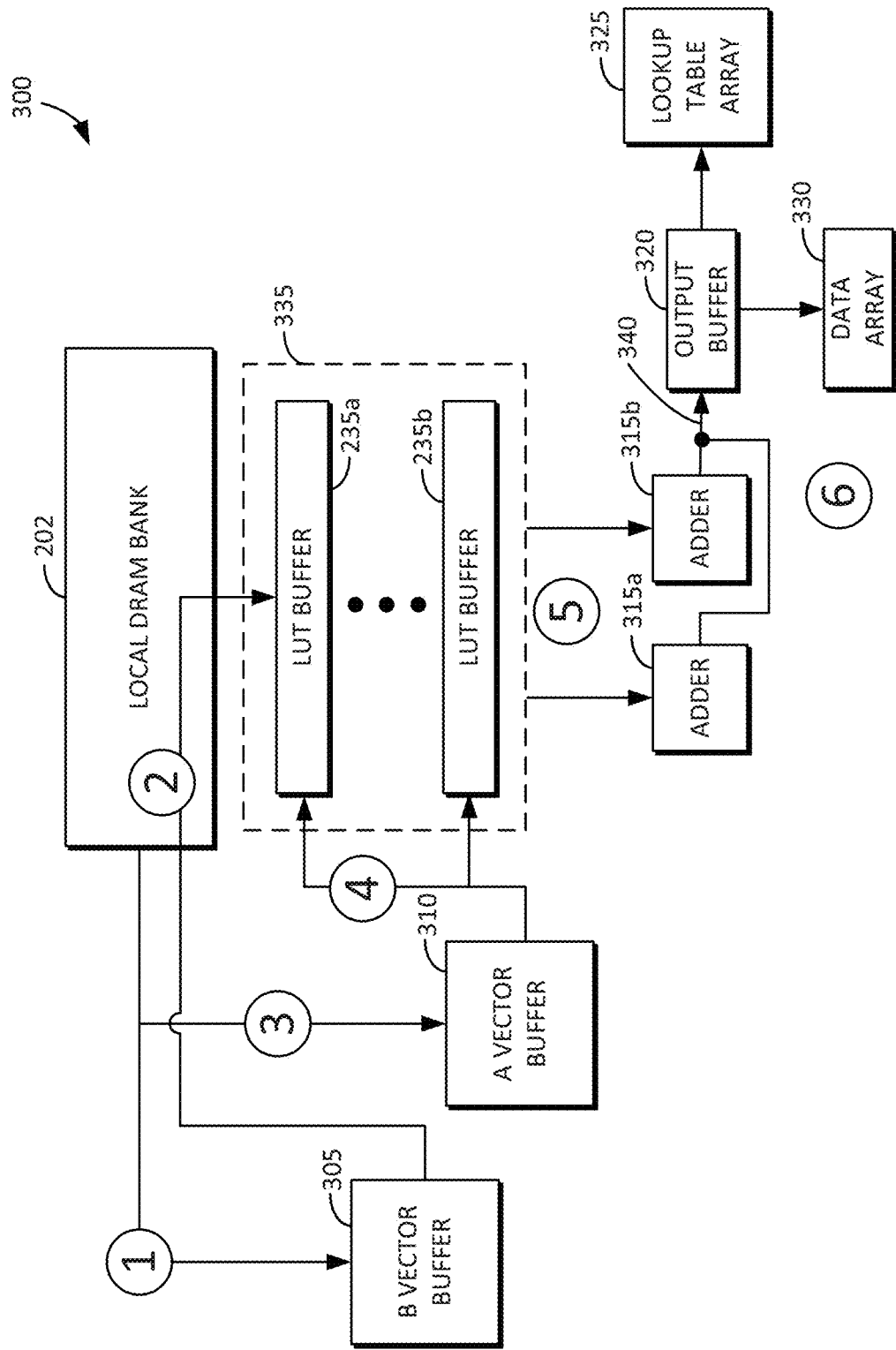
FIG. 3 is an example block diagram of a GEMM dataflow accelerator in accordance with some embodiments disclosed herein.

FIG. 3 is an example block diagram of a GEMM dataflow accelerator 300 in accordance with some embodiments disclosed herein. The GEMM dataflow accelerator 300 may include a local DRAM bank 202, a lookup table buffer section 335 that includes multiple lookup table buffers (e.g., 235a and 235b). The GEMM dataflow accelerator 300 may further include a B-vector buffer 305 and an A-vector buffer 310. The GEMM dataflow accelerator 300 may further include one or more adders (e.g., 315a and 315b). The GEMM dataflow accelerator 300 may further include an output buffer 320.

The GEMM dataflow accelerator 300 may perform one or more outer-product operations. In a first step indicated by circle 1, a B-vector may be read from the local DRAM bank 202 and stored in the B-vector buffer 305. At circle 2, the B-vector may be saved to the lookup table buffer 235a in a DRAM row clone operation. In a third step indicated by circle 3, an A-vector may be read from the local DRAM bank 202 and stored in the A-vector buffer 310. At circle 4, the A-vector may be streamed to one or more of the lookup table buffers (e.g., 235a and 235b), and a product (e.g., 140 of FIG. 1) may be determined based on the A-vector and B-vector information associated with the lookup table (e.g., 105 of FIG. 1) in the DRAM bank 202. In other words, the lookup table buffers (e.g., 235a and 235b) may determine the product without performing a multiplication operation. At circle 5, an add operation may be performed on the product (e.g., 140 of FIG. 1). A result 340 of the add operation may be stored in the output buffer 320. In other words, the product may be added to another product, and the summed products accumulated. At circle 6, the output buffer 320 may send the result 340 to a lookup table array 325 and/or to a data array 330.

Steps circle 1, circle 2, and circle 3 can utilize bank-level high bandwidth. The steps shown at steps circle 3, circle 4, circle 5, and circle 6 may be repeated multiple times, and many times more than the steps circle 1 and circle 2. The reason for this is that there may be a high buffer hit rate with respect to the multiple lookup table buffers (e.g., 235*a* and 235*b*) provided in the lookup table buffer section 335. Accordingly, by providing many lookup table buffers (e.g., 235*a* and 235*b*) in the lookup table buffer section 335, the performance of the full lookup table (e.g., 105) stored in the DRAM bank 202 is significantly improved. For example, 8, 16, 32, 64, 128, 256, or more lookup table buffers may be used.

FIG. 4 is an example block diagram showing a side elevation view of an integrated stack dataflow accelerator 400 in accordance with some embodiments disclosed herein. The integrated stack dataflow accelerator 400 may include a multiple layers 405 of near-DRAM-processing dataflow (NDP-DF) accelerator units 410. While four NDP-DF accelerator units 410 are shown in FIG. 4, it will be understood that any suitable number of NDP-DF accelerator units 410 may be stacked one atop another. The NDP-DF accelerator units 410 may be stacked one atop another in a vertical direction. The NDP-DF accelerator units 410 may be stacked on a base die 415. The base die 415 can include a controller, a buffer, processing logic, or the like. The base die 415 can be stacked on a passive silicon interposer 420. A processor (e.g., xPU 425) can be stacked on the passive silicon interposer 420 adjacent to the base die 415. The processor may be a central processing unit (CPU), a graphical processing unit (GPU), or other suitable processor.

Computation may be offloaded from the processor 425 onto the stack 405 of NDP-DF accelerator units 410 and the base die 415 as shown at 430. Through silicon vias (TSVs) 435 may be disposed through one or more of the NDP-DF accelerator units 410. The TSVs 435 may interconnect the NDP-DF accelerator units 410 with the base die 415. Alternatively or in addition, the TSVs 435 may interconnect the base die 415 with the processor 425. The TSVs 435 may interconnect the base die 415 with the processor 425 by way of the passive silicon interposer 420.

FIG. 5 is an example block diagram showing a plan view of the integrated stack dataflow accelerator 400 in accordance with some embodiments disclosed herein. The integrated stack dataflow accelerator 400 may include multiple stacks 405 of NDP-DF accelerator units 410. Each of the stacks of NDP-DF accelerator units 410 may be communicatively coupled to the processor 425 by way of the passive silicon interposer 420. A host 500 may be communicatively coupled to the integrated stack dataflow accelerator 400 by way of a communication link 505. The communication link 505 may be a wired link, a wireless link, a card, a port, or the like.

Figure 6:
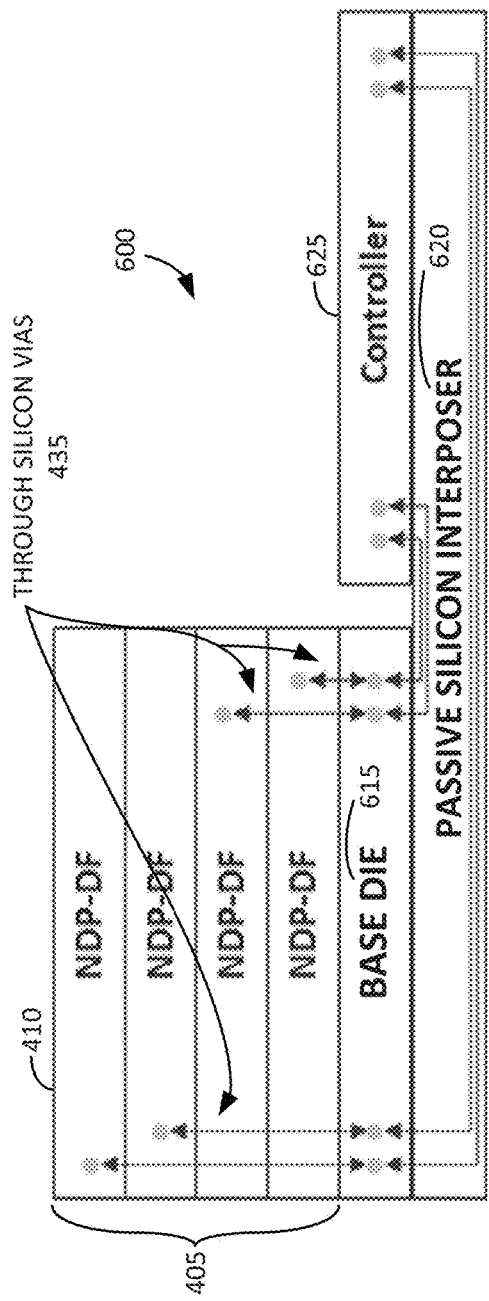
FIG. 6 is an example block diagram showing a side elevation view of a discrete stack dataflow accelerator in accordance with some embodiments disclosed herein.

FIG. 6 is an example block diagram showing a side elevation view of a discrete stack dataflow accelerator 600 in accordance with some embodiments disclosed herein. The discrete stack dataflow accelerator 600 may include multiple layers 405 of NDP-DF accelerator units 410. While four NDP-DF accelerator units 410 are shown in FIG. 6, it will be understood that any suitable number of NDP-DF accelerator units 410 may be stacked one atop another. The NDP-DF accelerator units 410 may be stacked one atop another in a vertical direction. The NDP-DF accelerator units 410 may be stacked on a base die 615. The base die 615 can include a controller, a buffer, processing logic, or the like. The base die 615 can be stacked on a passive silicon interposer 620. A controller 625 can be stacked on the passive silicon interposer 620 adjacent to the base die 615.

Through silicon vias (TSVs) 435 may be disposed through one or more of the NDP-DF accelerator units 410. The TSVs 435 may interconnect the NDP-DF accelerator units 410 with the base die 615. Alternatively or in addition, the TSVs 435 may interconnect the base die 615 with the controller 625. The TSVs 435 may interconnect the base die 615 with the controller 625 by way of the passive silicon interposer 620.

Figure 7:
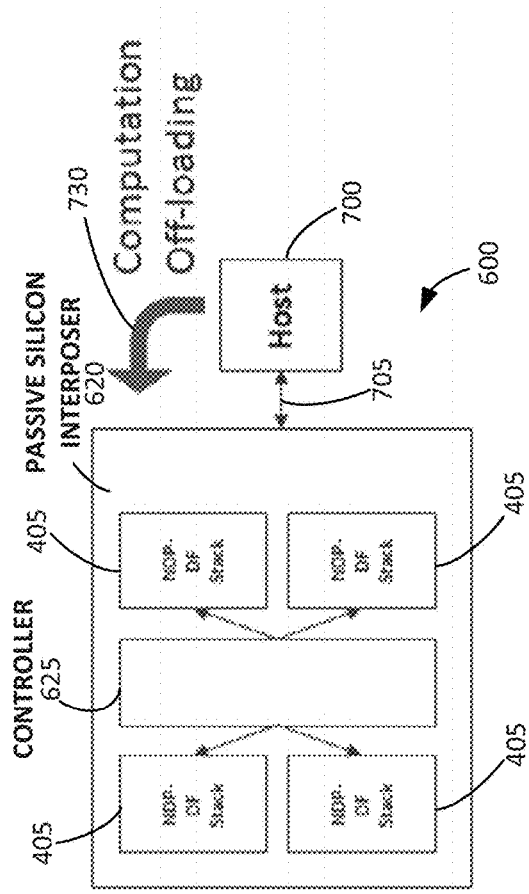
FIG. 7 is an example block diagram showing a plan view of the discrete stack dataflow accelerator in accordance with some embodiments disclosed herein.

FIG. 7 is an example block diagram showing a plan view of the discrete stack dataflow accelerator 600 in accordance with some embodiments disclosed herein. The discrete stack dataflow accelerator 600 may include multiple stacks 405 of NDP-DF accelerator units 410. Each of the stacks of NDP-DF accelerator units 410 may be communicatively coupled to the controller 625 by way of the passive silicon interposer 620. A host 700 may be communicatively coupled to the discrete stack dataflow accelerator 600 by way of a communication link 705. The communication link 705 may be a wired link, a wireless link, a card, a port, or the like. Computation may be offloaded from the host 700 onto the discrete stack dataflow accelerator 600 as shown at 730.

Figure 8:
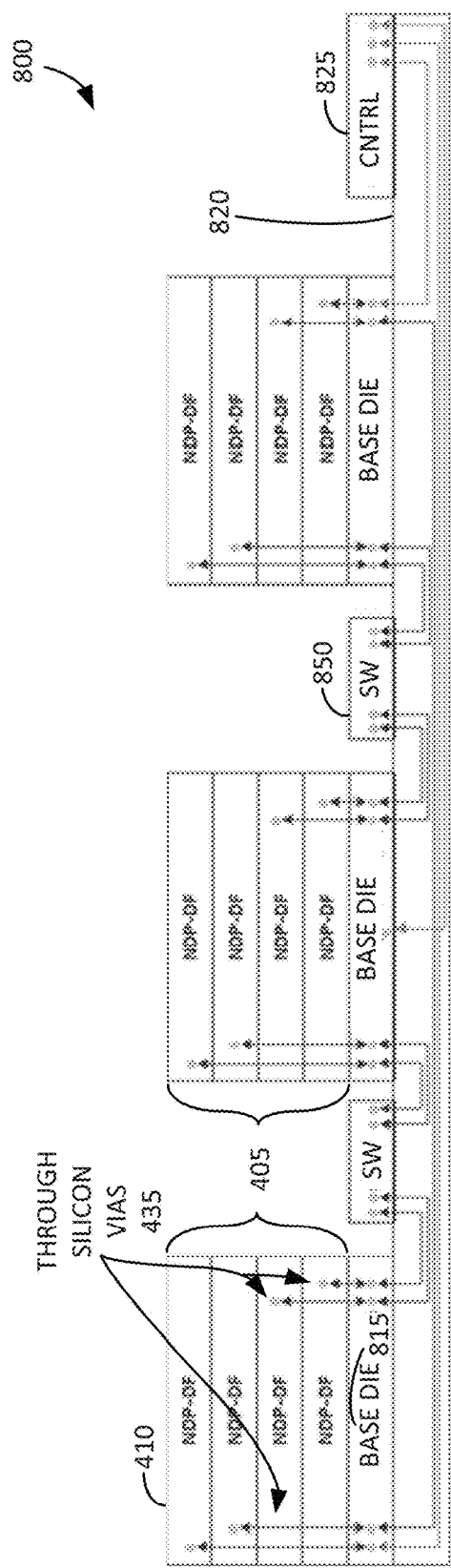
FIG. 8 is an example block diagram showing a side elevation view of a discrete stack dataflow accelerator in accordance with some embodiments disclosed herein.

FIG. 8 is an example block diagram showing a side elevation view of a discrete stack dataflow accelerator 800 in accordance with some embodiments disclosed herein. The discrete stack dataflow accelerator 800 may include multiple layers 405 of near-DRAM-processing dataflow (NDP-DF) accelerator units 410. While four NDP-DF accelerator units 410 for each stack 405 are shown in FIG. 8, it will be understood that any suitable number of NDP-DF accelerator units 410 may be stacked one atop another. The NDP-DF accelerator units 410 may be stacked one atop another in a vertical direction. The NDP-DF accelerator units 410 in each stack 405 may be stacked on a corresponding base die (e.g., 815). Each base die 815 can include a controller, a buffer, processing logic, or the like. Each base die 815 can be stacked on a passive silicon interposer 820. A controller 625 can be stacked on the passive silicon interposer 820 adjacent to one of the base dies 815.

Through silicon vias (TSVs) 435 may be disposed through one or more of the NDP-DF accelerator units 410. The TSVs 435 may interconnect the NDP-DF accelerator units 410 with a corresponding base die 815. Alternatively or in addition, the TSVs 435 may interconnect each base die 815 with the controller 825. The TSVs 435 may interconnect each base die 815 with the controller 825 by way of the passive silicon interposer 825. One or more switches 850 may be disposed on the passive silicon interposer 820 adjacent to one or more of the base dies 815. In some embodiments, the controller 825 also includes a switch.

Figure 9:
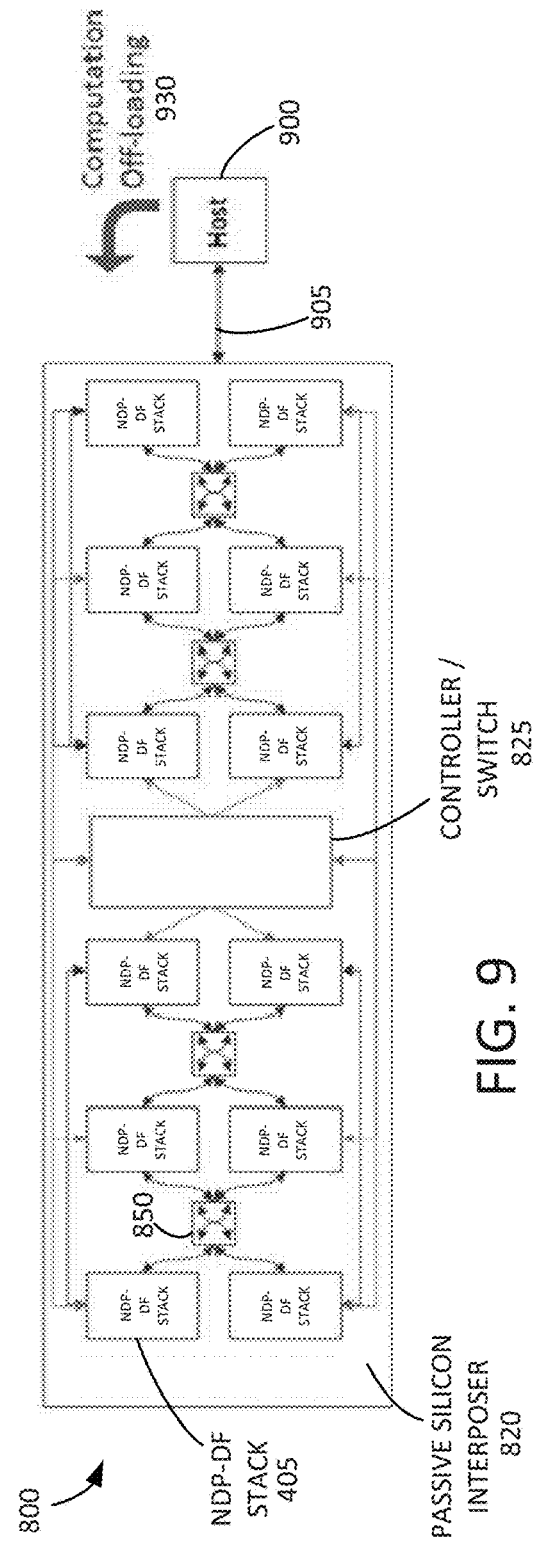
FIG. 9 is an example block diagram showing a plan view of the discrete stack dataflow accelerator in accordance with some embodiments disclosed herein.

FIG. 9 is an example block diagram showing a plan view of the discrete stack dataflow accelerator 800 in accordance with some embodiments disclosed herein. The discrete stack dataflow accelerator 800 may include multiple stacks 405 of NDP-DF accelerator units 410. In some embodiments, there are twelve (12) stacks 405 of NDP-DF accelerator units 410. In some embodiments, there are four (4) switches 850 apart from the controller/switch 825. Each switch 820 can be communicatively coupled to four (4) of the stacks 405 of NDP-DF accelerator units 410. Each of the stacks of NDP-DF accelerator units 410 may be communicatively coupled to the controller 825 by way of the switches 850 and/or the passive silicon interposer 820. In some embodiments, the controller/switch 825 is disposed in a central region of the passive silicon interposer 820 with six (6) stacks 405 of NDP-DF accelerator units 410 on either side thereof, and two (2) switches 850 on either side thereof.

A host 900 may be communicatively coupled to the discrete stack dataflow accelerator 800 by way of a communication link 905. The communication link 905 may be a wired link, a wireless link, a card, a port, or the like. Computation may be offloaded from the host 900 onto the discrete stack dataflow accelerator 800 as shown at 930.

Figure 10:
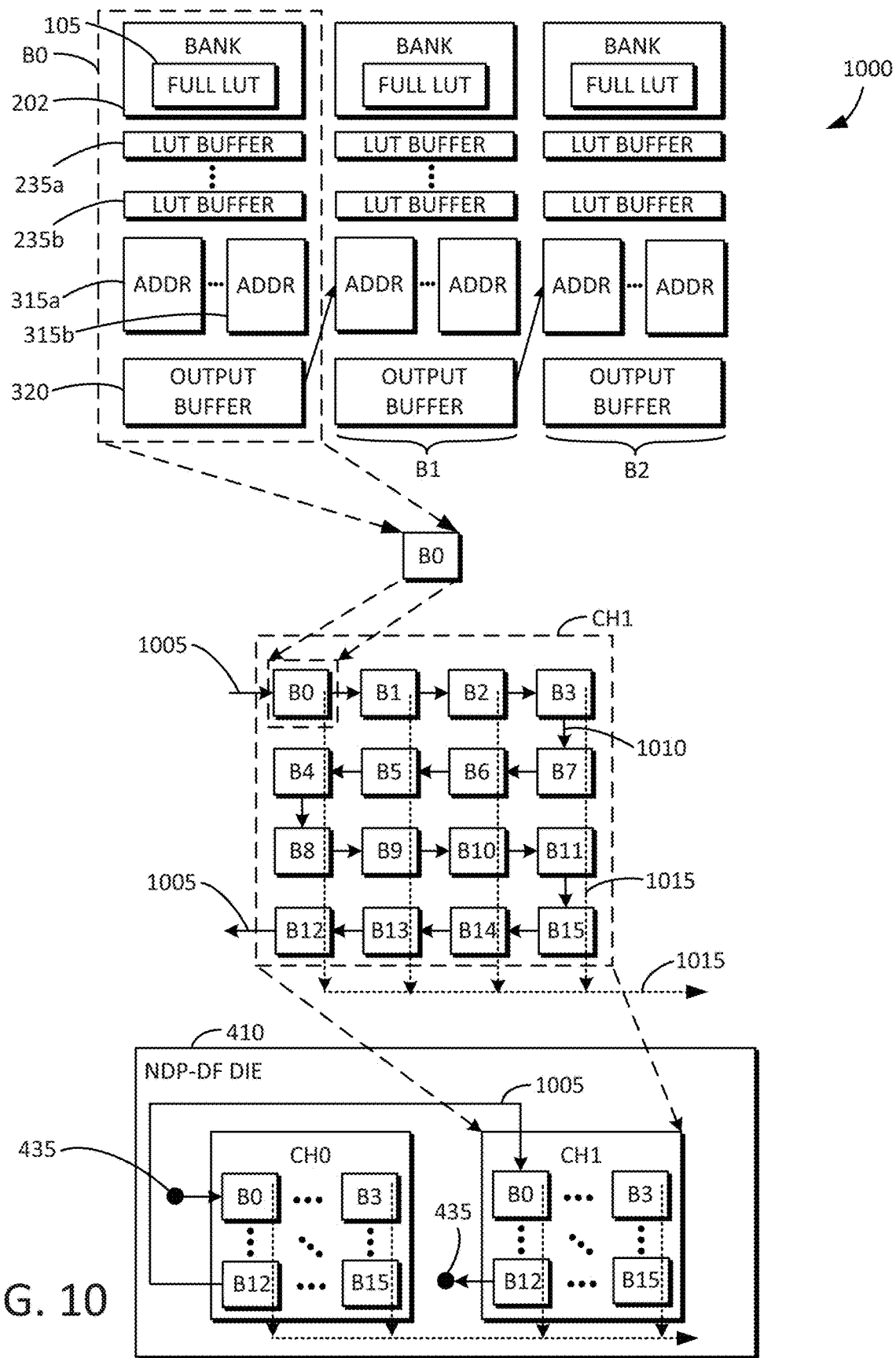
FIG. 10 is an example block diagram including the contents of a single NDP-DF die that may be used in connection with the GEMM dataflow accelerators in accordance with some embodiments disclosed herein.

FIG. 10 is an example block diagram 1000 including the contents of a single NDP-DF die 410 that may be used in connection with the floating point multiply-and-accumulate engine 100 and/or the GEMM dataflow accelerator 300 described above. The NDP-DF die 410 may include multiple channels (e.g., CH0, CH1). Each of the channels (e.g., CH0, CH1) may include multiple smart bank units (e.g., B0, B1, through B15). The channels (e.g., CH0, CH1) may be connected to each other by line 1005. For example, an output of the smart bank unit B12 of CH0 may be connected to an input of the smart bank unit B0 of CH1. The TSVs 435 may connect the channels (e.g., CH0, CH1) to other channels of other NDP-DF dies 410 (e.g., as shown in FIGS. 4-9). Solid lines 1010 within each channel (e.g., CH1) represent a systolic dataflow direction through each of the smart bank units of the channel. In other words, the systolic dataflow may travel through each of the smart bank units in a serpentine fashion, starting with the smart bank unit B0, then traveling to the smart bank unit B3, then changing directions and traveling the opposite direction from the smart bank unit B7 to the smart bank unit B4, then changing directions again, and so forth. Dotted lines 1015 within each channel (e.g., CH1) represent the bank data I/O path. The bank data I/O path therefore cuts across the serpentine dataflow through the smart bank units.

Each of the smart bank units (e.g., B0) may include a DRAM bank (e.g., 202 of FIG. 3). Each of the DRAM banks (e.g., 202) may include a full lookup table (e.g., 105 of FIG. 1). Each of the DRAM banks (e.g., 202) may have associated therewith multiple lookup table buffers (e.g., 235a, 235b), multiple adders (e.g., 315a, 315b), and an output buffer (e.g., 320). The lookup table buffers (e.g., 235a, 235b) may temporarily store sections of the full lookup table 202, as explained above and below. In some embodiments, all read operations are local to each DRAM bank (e.g., 202), and all write operations are propagated to the next DRAM bank. The lookup table buffers (e.g., 235a, 235b), the adders (e.g., 315a, 315b), and the output buffers (e.g., 320) may be peripheral to each of the DRAM banks (e.g., 202) and connect neighboring banks. Other peripheral logic such as multiplexors and de-multiplexors (not shown) may also be included. An output from an output buffer may be fed into an adjacent bank. For example, the output from the output buffer of one bank may be fed to an adder of an adjacent bank. Parallelism may be achieved both spatially and temporally. In other words, for a given processing cycle among a number of temporal processing cycles, matrix data may be processed by multiple banks in parallel. Each new processing cycle may have matrix data being processed by multiple different banks in parallel. Accordingly, performance of the GEMM dataflow accelerators disclosed herein can be increased.

Figure 11:
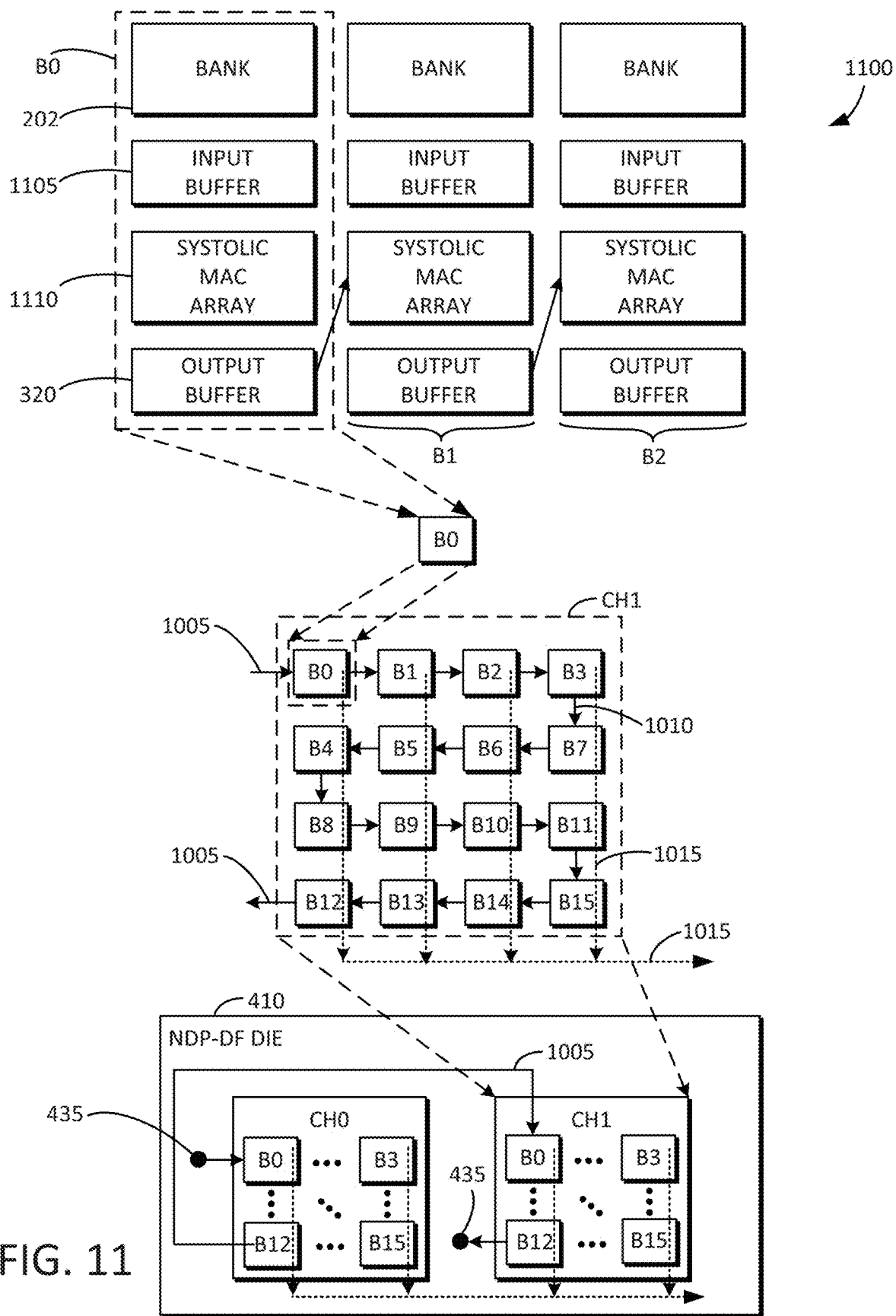
FIG. 11 is an example block diagram including the contents of a single NDP-DF die that may be used in connection with tensor computation dataflow accelerators in accordance with some embodiments disclosed herein.

FIG. 11 is an example block diagram 1100 including the contents of a single NDP-DF die 410 that may be used in connection with tensor computation dataflow accelerators described below. The NDP-DF die 410 may include multiple channels (e.g., CH0, CH1). Each of the channels (e.g., CH0, CH1) may include multiple smart bank units (e.g., B0, B1, through B15). The channels (e.g., CH0, CH1) may be connected to each other by line 1005. For example, an output of the smart bank unit B12 of CH0 may be connected to an input of the smart bank unit B0 of CH1. The TSVs 435 may connect the channels (e.g., CH0, CH1) to other channels of other NDP-DF dies 410 (e.g., as shown in FIGS. 4-9). Solid lines 1010 within each channel (e.g., CH1) represent a systolic dataflow direction through each of the smart bank units of the channel. In other words, the systolic dataflow may travel through each of the smart bank units in a serpentine fashion, starting with the smart bank unit B0, then traveling to the smart bank unit B3, then changing directions and traveling the opposite direction from the smart bank unit B7 to the smart bank unit B4, then changing directions again, and so forth. Dotted lines 1015 within each channel (e.g., CH1) represent the bank data I/O path. The bank data I/O path therefore cuts across the serpentine dataflow through the smart bank units.

Each of the smart bank units (e.g., B0) may include a DRAM bank (e.g., 202 of FIG. 3). Each of the DRAM banks (e.g., 202) may have associated therewith an input buffer (e.g., 1105), a systolic multiply and accumulate (MAC) array 1110, and an output buffer (e.g., 320). In some embodiments, all read operations are local to each DRAM bank (e.g., 202), and all write operations are propagated to the next DRAM bank. The input buffers (e.g., 1105), the MAC arrays (e.g., 1110), and the output buffers (e.g., 320) may be peripheral to each of the DRAM banks (e.g., 202) and connect neighboring banks. Other peripheral logic such as multiplexors and de-multiplexors (not shown) may also be included. An output from an output buffer may be fed into an adjacent bank. For example, the output from the output buffer of one bank may be fed to a systolic MAC array of an adjacent bank. Parallelism may be achieved both spatially and temporally. In other words, for a given processing cycle among a number of temporal processing cycles, matrix data may be processed by multiple banks in parallel. Each new processing cycle may have matrix data being processed by multiple different banks in parallel. Accordingly, performance of the tensor computation dataflow accelerators disclosed herein can be increased.

FIG. 12 is an example block diagram of a tensor computation dataflow accelerator 1200 in accordance with some embodiments disclosed herein. FIG. 13 is an example block diagram 1300 of a MAC unit 1210. Reference is now made to FIGS. 12 and 13.

The tensor computation dataflow accelerator 1200 may include a local DRAM bank 202, one or more input buffers (e.g., 1105), a systolic MAC array 1110, and an output buffer 320. The systolic MAC array 1110 may include multiple processing engines (PE) (e.g., 1215). In some embodiments, the input buffers 1105 form a double buffer 1205. Each PE 1215 may include an input buffer 1220, a MAC unit 1210, a weight buffer 1225, and a partial sum buffer 1230. A dotted vertical line 1235 within the PE 1215 shows an input direction of data. Horizontal solid lines 1240 within the PE 1215 show a partial sum direction of data. The weight buffer 1225 may feed a weight value to the MAC unit 1210. The MAC unit 1210 may include a multiplier circuit 1305 and an adder circuit 1310 as shown in FIG. 13.

The tensor computation dataflow accelerator 1200 may perform scalar-vector multiplication operations with input coming from one PE and partial results going to the next PE in the systolic MAC array 1110. Weights may be predefined and stored in the local weight buffer 1225 of each PE (e.g., 1215) in preparation for performing multiply and accumulate operations, as further described below.

Figure 14:
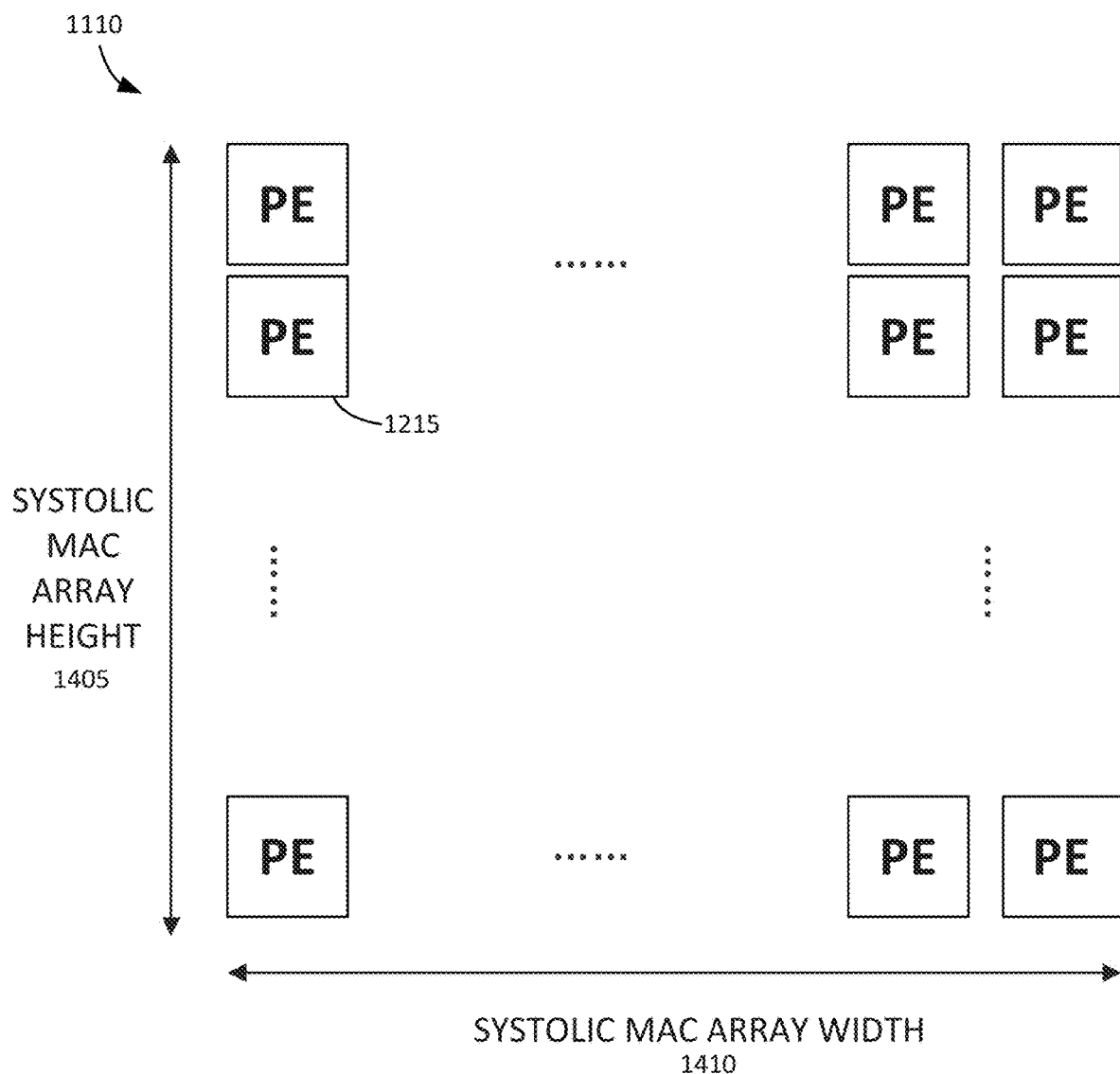
FIG. 14 is an example block diagram showing a height of the systolic MAC array and a width of the of the systolic MAC array.

FIG. 14 is an example block diagram showing a height 1405 of the systolic MAC array 1110 and a width 1410 of the of the systolic MAC array 1110. It will be understood that the systolic MAC array 1110 may have any suitable number of PEs 1215, any suitable height 1405, and any suitable width 1410.

Figure 15:
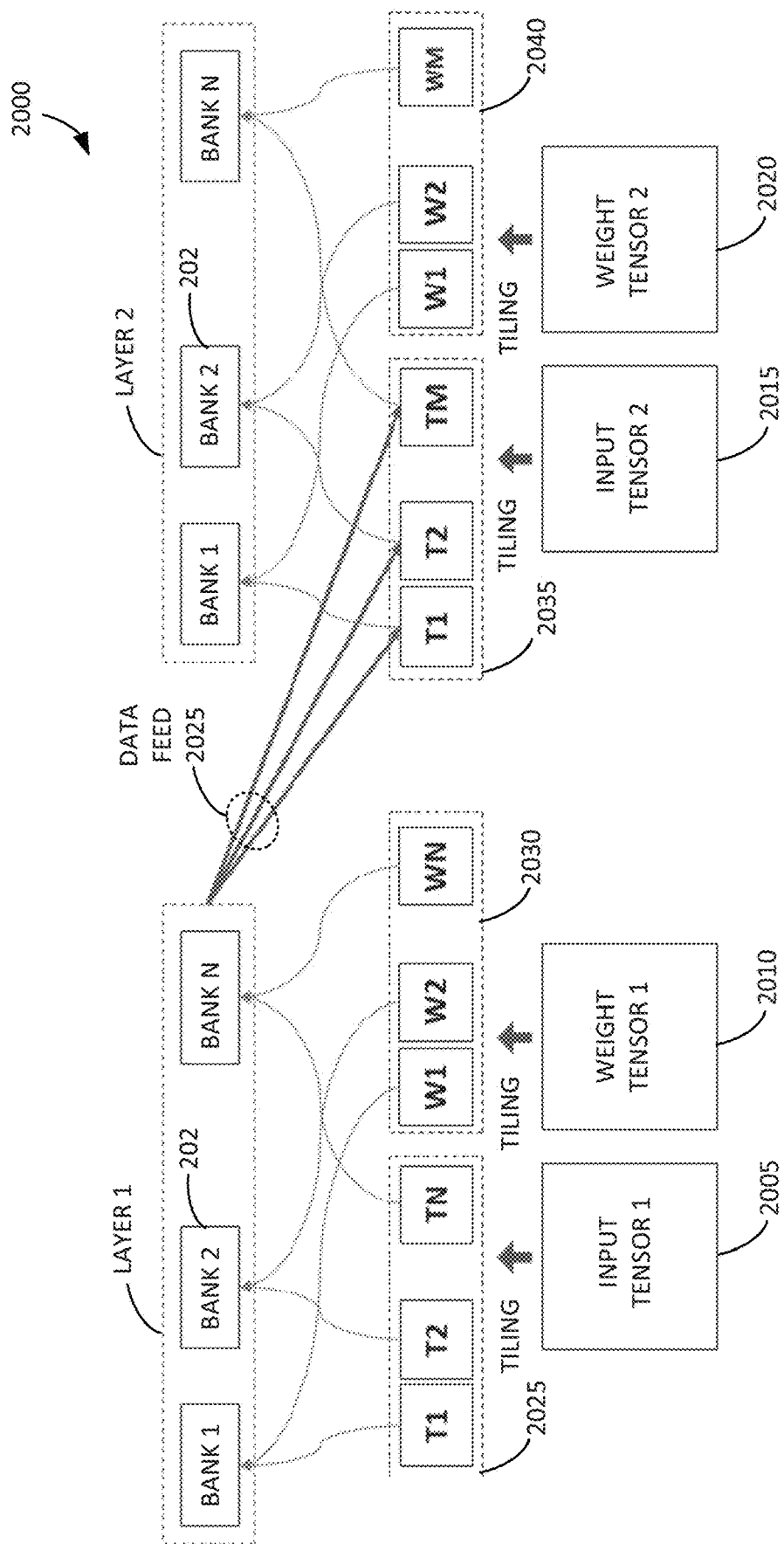
FIG. 15 is an example block diagram of an inter-layer data feeding and tiling technique.

FIG. 15 is an example block diagram 2000 of an interlayer data feeding and tiling technique. The technique may include multiple layers of banks (e.g., layer 1 and layer 2). Each of the layers may include multiple banks (e.g., bank 1 through bank N). A first input tensor may be provided at 2005. A first weight tensor may be provided at 2010. A second input tensor may be provided at 2015. A second weight tensor may be provided at 2020. A first tiling group 2025 of input tensors (e.g., T1 through TN) may be associated with multiple banks (e.g., bank 1 through bank N) of layer 1. A second tiling group 2030 of weight tensors (e.g., W1 through WN) may be associated with multiple banks (e.g., bank 1 through bank N) of layer 1. A third tiling group 2035 of input tensors (e.g., T1 through TM) may be associated with multiple banks (e.g., bank 1 through bank N) of layer 2. A fourth tiling group 2040 of weight tensors (e.g., W1 through WM) may be associated with multiple banks (e.g., bank 1 through bank N) of layer 2. A data feed 2025 may be provided between the layer 1 banks and the third tiling group 2035.

FIG. 16 is an example block diagram of a microarchitecture of a processing group (PG) 2105 of a tensor computation dataflow accelerator in accordance with embodiments disclosed herein. The PG 2105 may include multiple PEs (e.g., PE[1] through PE[8]). The PEs may be connected to each other and to TSVs 2115 by way of a shared data bus 2110. The PG 2105 may be connected to a switch 2130 by way of the TSVs 2115 and TSVs 2120. A controller 2125 may be communicatively coupled to the switch 2130 and/or the PG 2105, and may control the switch 2130 and/or the PG 2105.

FIG. 17 is an example side elevation view of a cube 2205 of PGs of a tensor computation dataflow accelerator in which multiple PGs (e.g., PG[1] through PG[8]) may be stacked one atop another in multiple stacks (e.g., 2210 and 2215) to form a cube of PGs in accordance with some embodiments disclosed herein. TSVs 2140 may interconnect the PGs of each stack.

FIG. 18 is an example plan view of the cube 2205 of PGs of a tensor computation dataflow accelerator including multiple vaults (e.g., vault[1] through vault[8]) of PGs. For example, a vault may include a vertical grouping of PGs.

FIG. 19 is an example diagram of a base die 2405 of a tensor computation dataflow accelerator in accordance with some embodiments disclosed herein. The base die 2405 may include a network interface 2410 and a programmable core 2415. The base die 2405 may further include multiple vault peripherals 2420. Each vault peripheral 2420 may include a buffer 2425, one or more ALUs 2430, a switch 210, a controller 2125, and/or one or more TSVs 2120. Each of the vault peripherals (e.g., 2420) may be associated with a corresponding vault (e.g., vault[1] of FIG. 18), and provide supporting buffering, processing, and switching services to the corresponding vault.

FIG. 20 is an example block diagram of a tensor computation dataflow accelerator 2500 including a passive silicon interposer 2505, and multiple cubes (e.g., 2205) disposed thereon. The cubes (e.g., 2205) may communicate one with another, as illustrated by the crisscrossing arrows.

Figure 21:
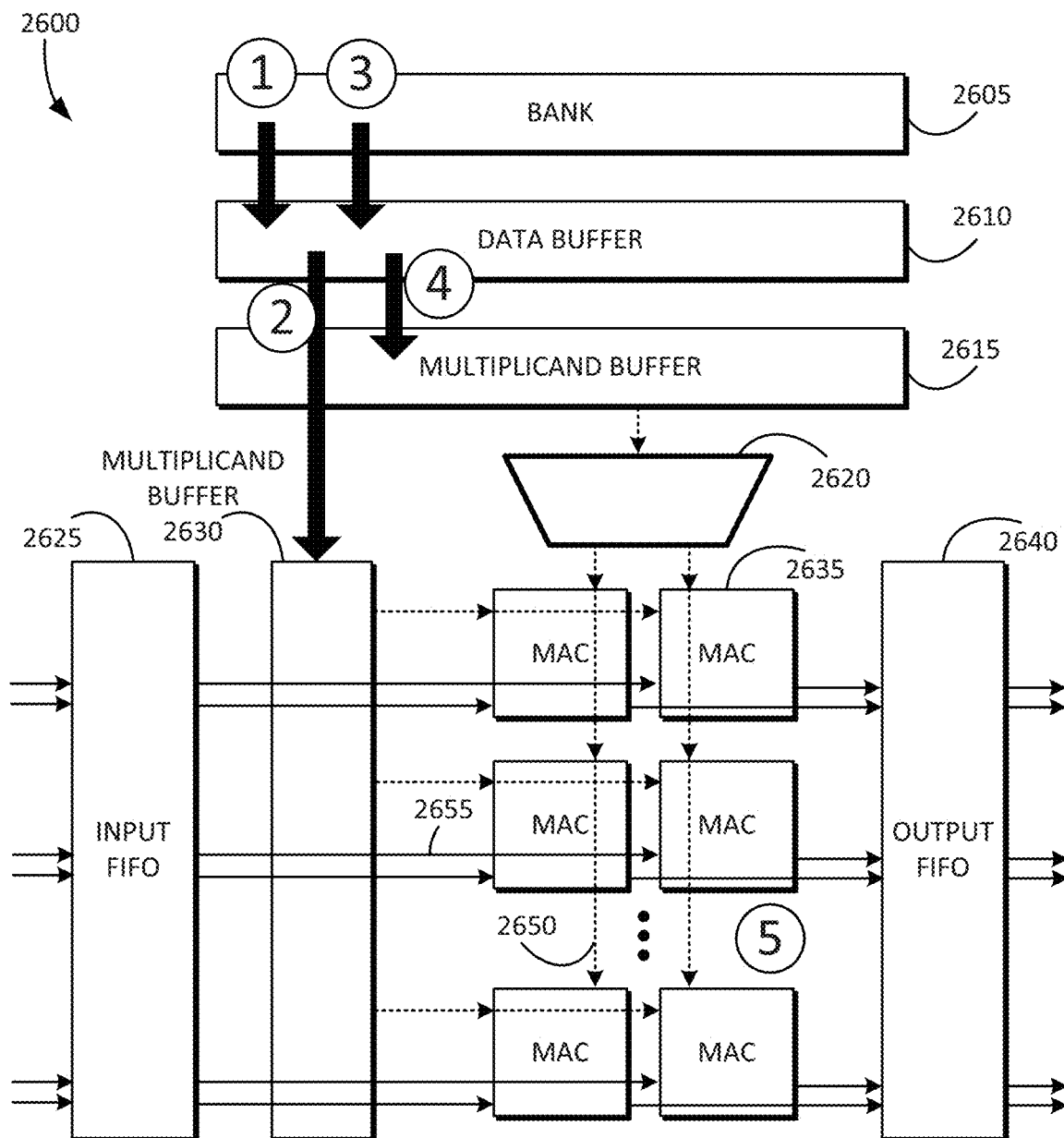
FIG. 21 is an example block diagram of a tensor computation dataflow accelerator in accordance with some embodiments disclosed herein.

FIG. 21 is an example block diagram of a tensor computation dataflow accelerator 2600 in accordance with some embodiments disclosed herein. The tensor computation dataflow accelerator 2600 may include a DRAM bank 2605, a data buffer 2610, a first multiplicand buffer 2615, a selector such as a multiplexor 2620, an input first-in-first-out (FIFO) 2625, a second multiplicand buffer 2630, multiple MACs (e.g., 2635), and an output FIFO 2640.

The tensor computation dataflow accelerator 2600 may perform one or more computation mapping operations. In a first step indicated by circle 1, an A-vector may be read from the local DRAM bank 2605 and stored in the data buffer 2610. At circle 2, the A-vector may be copied and stored in the multiplicand buffer 2630. In a third step indicated by circle 3, a B-vector may be read from the local DRAM bank 2605 and stored in the data buffer 2610. At circle 4, the B-vector may be copied and stored in the multiplicand buffer 2615. At circle 5, scalar-vector multiplication may be performed multiple times using the MACs (e.g., 2635), with input coming from a given PE, and partial results being forwarded to the next PE, and so forth. Vertical dotted lines (e.g., 2650) represent the input direction of matrix data received from the multiplicand buffer 2615 by way of the multiplexor 2620. Horizontal solid lines (e.g., 2655) represent the flow direction of partial sums as they are propagated and accumulated across the MACs (e.g., 2635). It will be understood that the array of MACs 2635 can have any suitable height and width.

Figure 22:
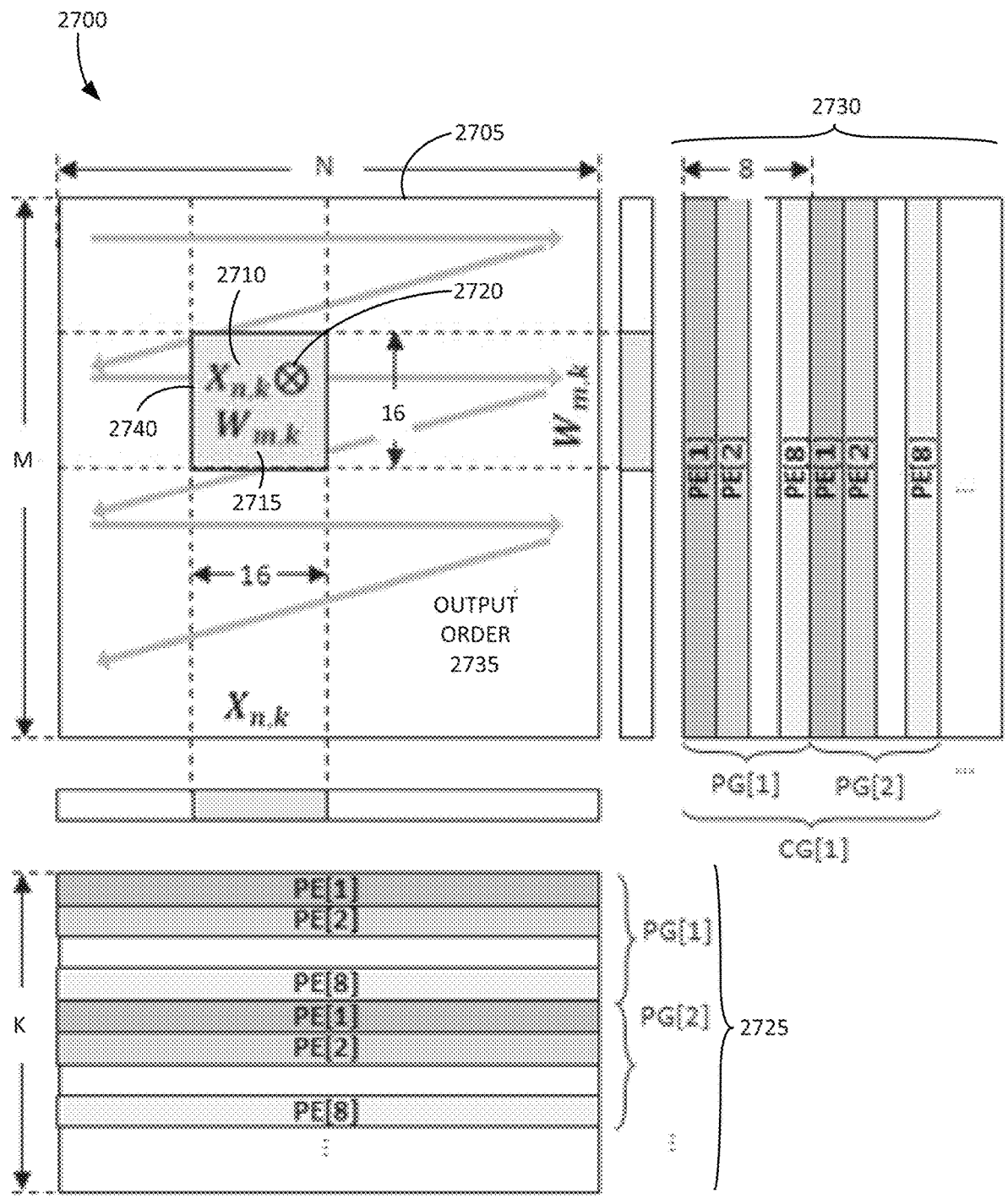
FIG. 22 is an example block diagram of a forward propagation data layout and dataflow in accordance with some embodiments disclosed herein.

FIG. 22 is an example block diagram of a forward propagation data layout and dataflow 2700 in accordance with some embodiments disclosed herein. The data layout and dataflow 2700 may include an output matrix 2705. The output matrix 2705 shows an example partial vector 2710 and partial vector 2715, and an associated outer product operation 2720. An input matrix 2725 is shown, which may include multiple PGs (PG[1], PG[2], etc.). Each of the PGs may include multiple PEs (PE[1], PE[2], etc.). A weight matrix 2730 is also shown. The weight matrix 2730 may include multiple PGs (PG[1], PG[2], etc.). The weight matrix 2730 may include one or more compute groups (e.g., CG[1]), each including multiple PGs. Each of the PGs may include multiple PEs (PE[1], PE[2], etc.). In some embodiments, there are eight (8) PEs for each PG. An output order 2735 of operations is shown. For example, the outputs from the outer product operations 2720 may propagate in a serpentine fashion through the output matrix 2705. After a CG produces a tile (e.g., box 2740) of the final result, the tile of the final result may be streamed to the base die (e.g., 2405 of FIG. 19) for final reduction. After all partial results are reduced in the same channel, the partial results may be combined across channels, as further described below.

Figure 23:
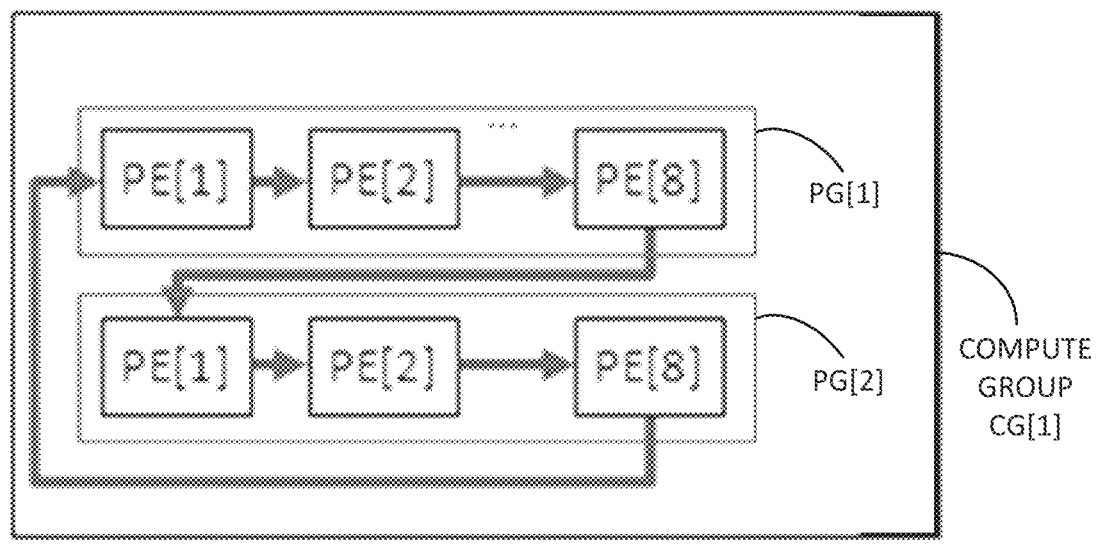
FIG. 23 is an example block diagram of a compute group including multiple processing groups connected together in accordance with some embodiments disclosed herein.

FIG. 23 is an example block diagram of a compute group (e.g., CG[1]) including multiple processing groups (e.g., PG[1], PG[2]) connected together in accordance with some embodiments disclosed herein. For example, each PG may include multiple PEs (e.g., PE[1] through PE[8]). An output of one PE (e.g., PE[8]) from one PG (e.g., PG[1]) may be fed into an input of another PE (e.g., PE[1]) of another PG (e.g., PG[2]). Accordingly, matrix data may be processed and accumulated.

Figure 24:
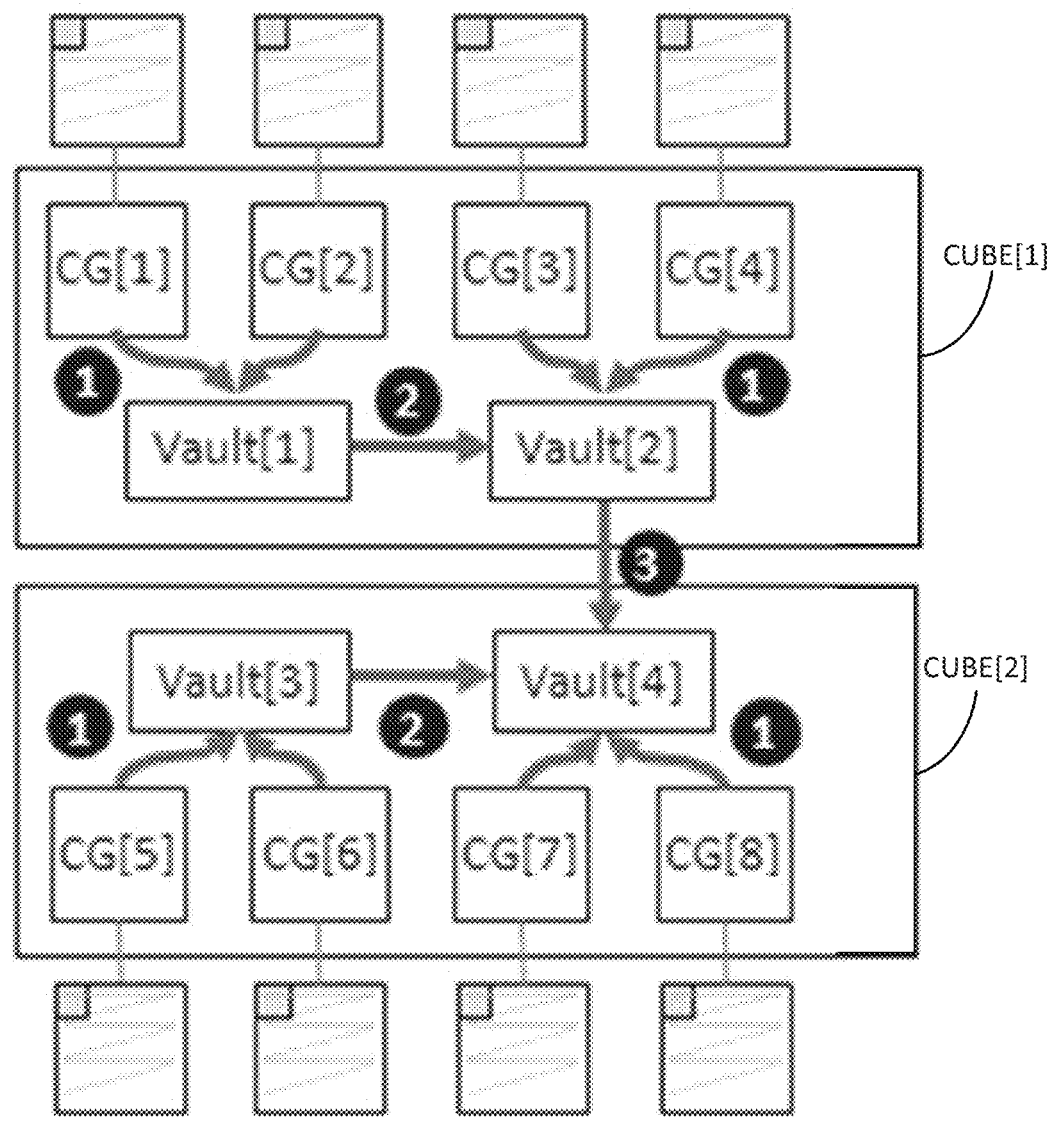
FIG. 24 is an example block diagram of multiple cubes of a tensor computation dataflow accelerator showing how a reduction operation is performed in accordance with some embodiments disclosed herein.

FIG. 24 is an example block diagram of multiple cubes (e.g., cube[1], cube[2]) of a tensor computation dataflow accelerator (e.g., 2600 of FIG. 21) in accordance with some embodiments disclosed herein. Each cube (e.g., cube[1], cube[2]) may include multiple compute groups (e.g., CG[1], CG[2], etc.). Each compute group may feed matrix data into a vault (e.g., vault[1], vault[2], etc.) such that the matrix data is reduced in a reduction operation to the corresponding vault, as show at circle 1. At circle 2, the matrix data is aggregated and reduced from one vault (e.g., vault[1]) into another vault (e.g., vault[2]). At circle 3, the matrix data is aggregated and reduced to a vault from cube[2] (e.g., vault[4]) in a cross-cube accumulation operation. This has a maximum latency of O(log 2(numberCG)) reduction rounds, and since this process is fully pipelined with output tiles of final results as they are gradually produced, the performance overhead is minimal and can be effectively ignored.

Figure 25:
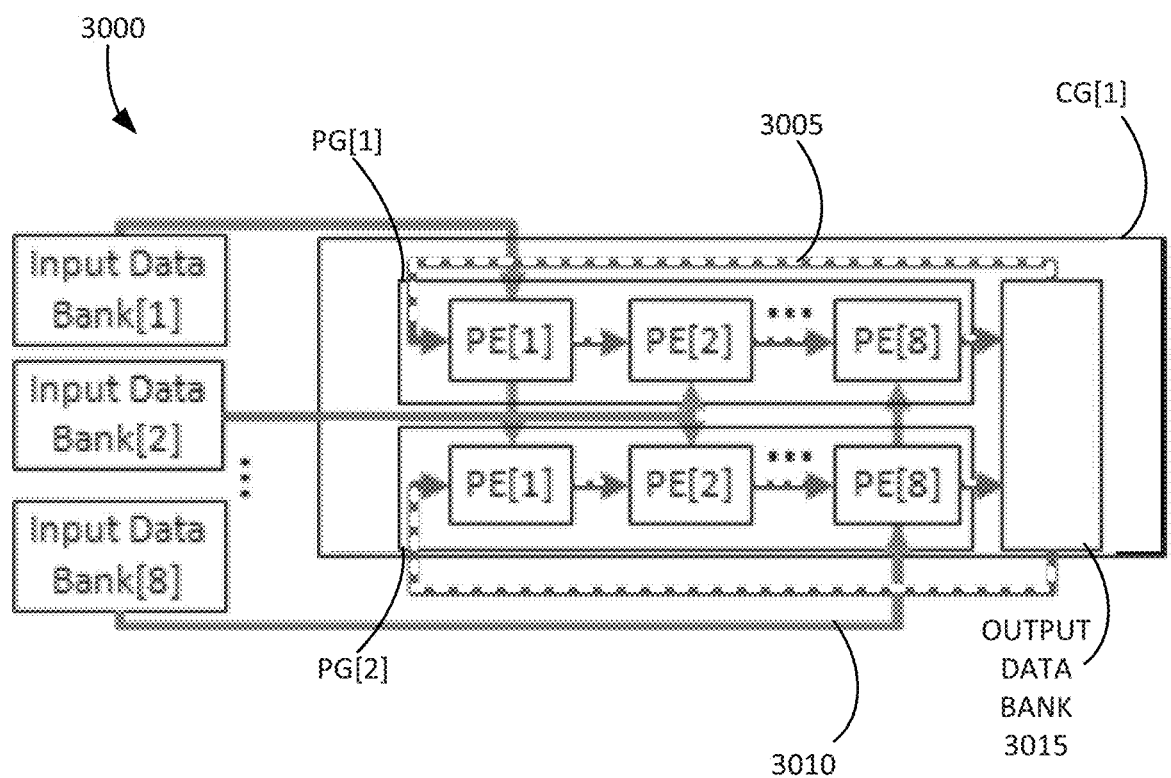
FIG. 25 to FIG. 27 are example block diagrams of a backward propagation data layout and dataflow in accordance with some embodiments disclosed herein.
Figure 26:
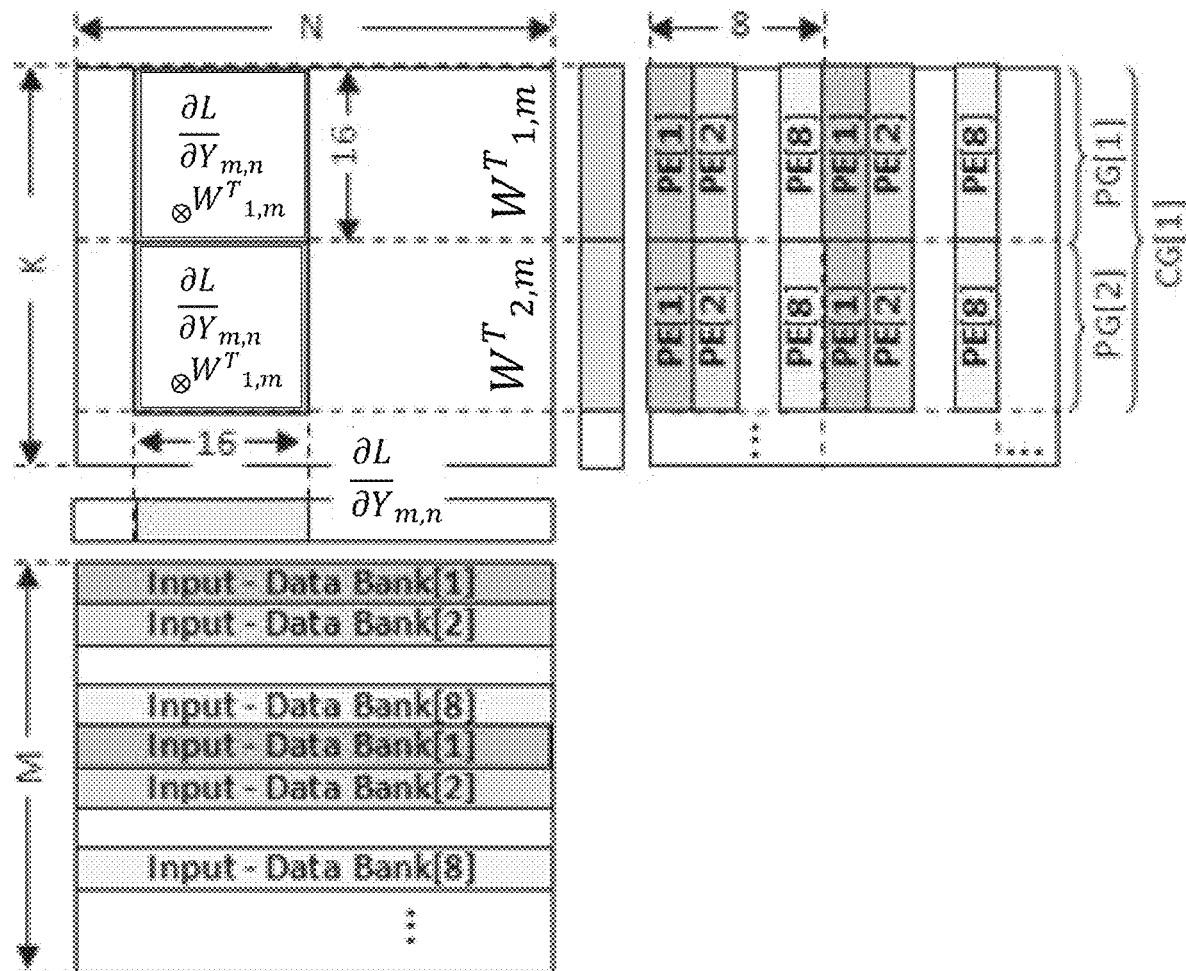
Figure 27:
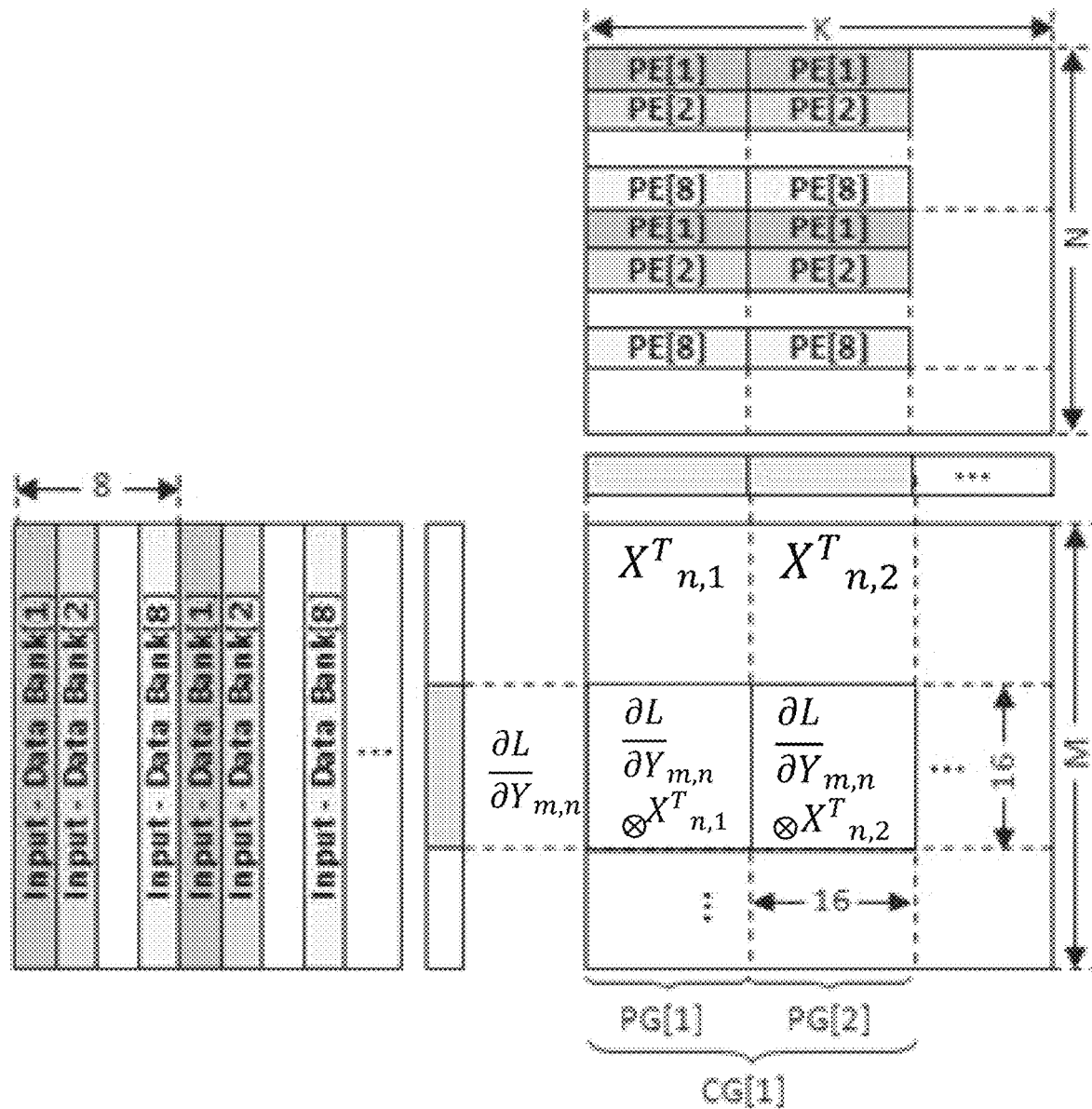

FIG. 25 to FIG. 27 are example block diagrams of a backward propagation data layout and dataflow 3000 in accordance with some embodiments disclosed herein. The backward propagation data layout and dataflow 3000 may include multiple input data DRAM banks (e.g., input data bank[1], input data bank[2], etc.). The backward propagation data layout and dataflow 3000 may further include an output data bank 3015. The backward propagation data layout and dataflow 3000 may further include multiple PGs (e.g., PG[1] and PG[2]), with each PG including multiple PEs (e.g., PE[1], PE[2], etc.). Dotted lines 3005 represent partial result accumulation, and solid lines 3010 represent input data broadcasting. In other words, input matrix data may be received by way of lines 3010 from the input data banks (e.g., input data bank[1], input data bank[2], etc.) and provided to the PEs (e.g., PE[1], PE[2], etc.). The PEs may use the input matrix data to perform multiplication and addition operations, and the partial results may then be accumulated along the lines 3005.

Following is a pseudo-code example of forward data layout software partition technique in accordance with some embodiments disclosed herein.

Following is a pseudo-code example of backward data layout in accordance with some embodiments disclosed herein.

+Backward Pass: $\text{Init}(X_{addr}[:,:] = X_{InitAddr}; W_{addr}[:,:] = W_{InitAddr});$
for k = 0; k < K; k += 16 do $\quad cgID = \text{floor}\left(\dfrac{k}{16 \cdot num_{PG}}\right) + 1; \; cgID = \text{floor}\left(\dfrac{k}{16}\right)(\text{mod } num_{PG}) + 1;$ $\quad$ for m = 0; m < M; m ++ do $\quad\quad peID = \text{floor}\left(\dfrac{m}{num_{PE}}\right) + 1; \; BK_{index} \leftarrow [id_{CG}, id_{PG}, id_{PE}];$ $\quad\quad \text{Alloc}\left(PE[BK_{index}], W[m, k:k+mtile], W_{addr}[BK_{index}], \dfrac{mtile}{16}\right);$ $\quad\quad W_{addr}[BK_{index}] \mathrel{+}= \dfrac{mtile}{16};$ $\quad$ for n = 0; n < N; n ++ do $\quad\quad peID = \text{floor}\left(\dfrac{n}{num_{PE}}\right) + 1; \; BK_{index} \leftarrow [id_{CG}, id_{PG}, id_{PE}];$ $\quad\quad \text{Alloc}\left(PE[BK_{index}], X[k+ntile, n], X_{addr}[BK_{index}], \dfrac{ntile}{16}\right);$ $\quad\quad X_{addr}[BK_{index}] \mathrel{+}= \dfrac{ntile}{16};$ Following is a pseudo-code example of forward computation scheduling software scheduling technique in accordance with some embodiments disclosed herein.

Input: M, K, N, $X \in R^{K \cdot N}, W \in R^{M \cdot K}$, PE
Parameter: mtile, ntile, $num_{PE}, num_{PG}, X_{InitAddr}, W_{InitAddr}$
Variable: m, n, k, $id_{PE}, id_{PG}, id_{CG}, X_{addr}, W_{addr}, BK_{index}$
+Forward Pass: $\text{Init}(X_{addr}[:,:] = X_{InitAddr}; W_{addr}[:,:] = W_{InitAddr});$
for k = 0; k < K; k ++ do $\quad id_{CG} = \text{floor}\left(\dfrac{k}{num_{PE} \cdot num_{PG}}\right) + 1; \; id_{PG} = \text{floor}\left(\dfrac{k}{num_{PE}}\right)(\text{mod } num_{PG}) + 1;$ $\quad id_{PE} = k(\text{mod } num_{PE}) + 1; \; BK_{index} \leftarrow [id_{CG}, id_{PG}, id_{PE}]$
$\quad$ for m = 0; m < M; m += mtile do $\quad\quad \text{Alloc}\left(PE[BK_{index}], W[m:m+mtile, k], W_{addr}[BK_{index}], \dfrac{mtile}{16}\right);$ $\quad\quad W_{addr}[BK_{index}] \mathrel{+}= \dfrac{mtile}{16};$ $\quad$ for n = 0; n < N; n += ntile do $\quad\quad \text{Alloc}\left(PE[BK_{index}], X[k, n:n+ntile], X_{addr}[BK_{index}], \dfrac{ntile}{16}\right);$ $\quad\quad X_{addr}[BK_{index}] \mathrel{+}= \dfrac{ntile}{16};$

```
+Forward Pass: (Y = W · X)
for k=0;k<K;k++ do
|       for m=0;m<M;m+=mtile do
|       |       for n=0;n<N;n+=ntile do
|       |       |       Fetch X[k,n:ntile] and W[m:mtile,k] from the local
|       |       |       bank;
|       |       |       Receive Y[k-1,m:m+mtile,n:ntile] (k>0) from
|       |       |       previous PE or the data bank, and then compute:
|       |       |       Y[k,m : m+mtile,n : ntile] = X[k,n : ntile]⊗W[m :
|       |       |       mtile,k]+
|       |       |       Y[k - 1,m : m + mtile,n : ntile]
|       |       |       Propagate accumulation results to the next PE or the
|       |       |       data bank; At last round, transpose X[k,n:ntile] and
|       |       |_      W[m:mtile,k] across all PEs inside a CG.
|       |_
|_      Accumlate results across different CGs.
```

Following is a pseudo-code example of backward computation scheduling in accordance with some embodiments disclosed herein.

```
+Backward Pass: (∂L/∂X = W^T · ∂L/∂Y)

for m = 0; m < M; m += I do
|   for k = 0; k < K; k += ktile do
|   |   for n = 0; n < N; n += ntile do
|   |   |   Fetch W^T[k:k + ktile, m] from the local bank;

|   |   |   Receive ∂L/∂Y [m, n:n + ntile] broadcast by data bank;

|   |   |   Receive ∂L/∂X [m - 1, k:k + ktile, n : n + mile](m > 0)

|   |   |   from previou PE or the data bank, and then
|   |   |   compute:

|   |   |   ∂L/∂X [m, k:k + ktile, n:n + ntile] = ∂L/∂Y [m, n:n + ntile]

|   |   |   ⊗W^T [k:k + ktile, m] + ∂L/∂X [m - 1, k:k + ktile, n:n + ntile]

|   |   |   Propagate accumulation results to the next PE or the
|   |   |   data band;
|   |   |   At the last round, transpose W^T[k:k + ktile, m] across
|   |   |_  all PEs inside a CG.
|   |_
|_  Accumulate Results independentily inside each CG.
```

Parallelism may be achieved both spatially and temporally. In other words, for a given processing cycle among a number of temporal processing cycles, matrix data may be processed by multiple banks in parallel. Each new processing cycle may have matrix data being processed by multiple different banks in parallel. Accordingly, performance of the tensor computation dataflow accelerators disclosed herein can be increased.

Accordingly, computing logic may be added to the periphery of each DRAM bank, turning a usually passive component into a smart processing engine. The controller in the base logic die in each vault may control data access and computation scheduling. The main computing resources (e.g., MAC array) may be disposed on a DRAM die as a peripheral side logic to the DRAM bank. A systolic MAC array using PEs causes the matrix data to be processed and accumulated. A transpose engine may be used for backward passes. Since the computing logic (e.g., MAC array) is adjacent to a DRAM bank, the memory is distributed, and backward-friendly memory layout and partial transpose layout are facilitated. 3D stacking DRAM technology may be used to enhance parallelism.

Embodiments disclosed herein have strong compute capability targeted at both memory-bound and compute-intensive kernels. Thus the MAC array and associated components may be embedded within a processing-in-memory (PIM) 3D stacking architecture with the computing logic integrated beside a DRAM bank, separate from a GPU compute section, for example. The matrix multiplication and other processing happens outside but adjacent to the DRAM bank, thereby making use of bank-level internal high bandwidth in which all read is from a local DRAM bank. Embodiments of the invention disclosed herein support floating point arithmetic, and are particularly useful, for example, with atrial neural networks and their associated training.

Embodiments disclosed herein target bandwidth-bound floating point GEMM operations in deep learning training. With a technique involving tiling on accumulation dimension (e.g., K dimension in GEMM[M, K, N]), there is no need to write back and no read-write conflict for the same bank. All write operations are propagated to the next level in the dataflow pipeline. All previous layers' output is the next layers' input bank, which reduces overall matrix data movement. Some embodiments disclosed herein include data layout and hardware support for matrix transpose, which enables a back-propagation process.

As disclosed herein, logic layers may be stacked in between or adjacent to DRAM dies, which communicate with each other vertically using TSVs. Hardware-efficiency is improved by minimizing the number of floating point multiplication units. The PIM architecture disclosed herein uses a partition method for the outer-product engine in which partial results are propagated among PEs in a systolic fashion. DRAM-based lookup tables may be used to reduce the area overhead of floating point units. A hierarchical structure is used to reduce latency of a lookup table-based floating point unit. An outer product computation technique is used for each PE. A partitioning and scheduling algorithm may be used for arbitrary-sized GEMM operations to improve performance and energy efficiency. Accordingly, floating point tensor multiplication is provided in a PIM architecture. A DRAM-based lookup table may be used to implement vector outer-products. A systolic array pipelined architecture may be used for inter-bank connection. Peripheral logic may be disposed outside of but adjacent to DRAM banks, such that no changes are required to DRAM core logic, thereby making embodiments disclosed herein very practical to implement. Compared with directly adding MAC units outside of a DRAM bank, a DRAM-based lookup table can save significant area overhead. Compared with NDP on base logic die technology, the embodiments disclosed herein provide higher internal bandwidth (bank-level rather than TSV-level) and higher computation performance. Multiple lookup table buffers may be used to reduce long-row activation latency and energy consumption.

The various operations of methods described above may be performed by any suitable means capable of performing the operations, such as various hardware and/or software component(s), circuits, and/or module(s).

Some embodiments include a tensor computation dataflow accelerator semiconductor circuit. The tensor computation dataflow accelerator semiconductor circuit may include a memory bank, and a peripheral array of multiply-and-add units disposed adjacent to the memory bank. In some embodiments, the peripheral array of multiply-and-add units are configured to form a pipelined dataflow chain in which partial output data from one multiply-and-add unit from among the array of multiply-and-add units is fed into another multiply-and-add unit from among the array of multiply-and-add units for data accumulation.

In some embodiments, the tensor computation dataflow accelerator semiconductor circuit may include a peripheral array of processing engines each including a multiply-and-add unit from among the peripheral array of multiply-and-add units. In some embodiments, each of the processing engines includes an input buffer, a partial sum buffer, and a weight buffer. In some embodiments, the weight buffer of each of the processing engines is configured to store a weight matrix vector in an initialized state. In some embodiments, the input buffer of a processing engine from among the peripheral array of processing engines is configured to receive an input matrix vector from the memory bank in a streaming fashion. In some embodiments, the multiply-and-add unit of the processing engine is configured to calculate a product of the input matrix vector and the weight matrix vector stored in the weight buffer of the processing engine.

In some embodiments, the peripheral array of processing engines is a systolic array that is configured to propagate partial sums in a serpentine fashion. In some embodiments, the peripheral array of processing engines is configured to receive a plurality of input matrix vectors in a streaming fashion, and to propagate the plurality of input matrix vectors in a direction that is perpendicular to a data flow direction of the partial sums.

In some embodiments, the memory bank is a DRAM memory bank. The circuit may further include a near-DRAM-processing dataflow (NDP-DF) accelerator unit die including a plurality of channels. In some embodiments, each of the channels includes a plurality of smart bank units arranged in a serpentine fashion. In some embodiments, each of the smart bank units includes a DRAM bank, an input buffer, a systolic MAC array, and an output buffer.

In some embodiments, the systolic MAC array includes the peripheral array of multiply-and-add units. In some embodiments, the NDP-DF accelerator unit die is one of a plurality of NDP-DF accelerator unit dies that are stacked one atop another.

In some embodiments, the tensor computation dataflow accelerator semiconductor circuit may further include a passive silicon interposer, a processor disposed on the passive silicon interposer, and a base die disposed on the passive silicon interposer adjacent to the processor. In some embodiments, the plurality of NDP-DF accelerator unit dies are stacked atop the base die. In some embodiments, the tensor computation dataflow accelerator semiconductor circuit may further include one or more through silicon vias (TSVs) disposed through the plurality of NDP-DF accelerator unit dies and the base die. In some embodiments, the one or more TSVs are configured to interconnect the plurality of NDP-DF accelerator unit dies with the base die, and the base die with the processor. In some embodiments, the plurality of NDP-DF accelerator unit dies and the base die are configured to offload computation from the processor.

In some embodiments, the tensor computation dataflow accelerator semiconductor circuit may further include a passive silicon interposer, a controller disposed on the passive silicon interposer, and a base die disposed on the passive silicon interposer adjacent to the controller. In some embodiments, the plurality of NDP-DF accelerator unit dies are stacked atop the base die. In some embodiments, the tensor computation dataflow accelerator semiconductor circuit may further include one or more through silicon vias (TSVs) disposed through the plurality of NDP-DF accelerator unit dies and the base die. In some embodiments, the one or more TSVs are configured to interconnect the plurality of NDP-DF accelerator unit dies with the base die, and the base die with the controller. In some embodiments, the plurality of NDP-DF accelerator unit dies and the base die are configured to offload computation from a host that is separate from the tensor computation dataflow accelerator semiconductor circuit.

In some embodiments, the plurality of stacked NDP-DF accelerator unit dies and the base die are configured to process the partial output data in parallel. In some embodiments, the plurality of stacked NDP-DF accelerator unit dies and the base die are configured to propagate partial output data in a backward direction. In some embodiments, the plurality of stacked NDP-DF accelerator unit dies and the base die are configured to perform a partial matrix transposition.

Some embodiments disclosed herein include GEMM dataflow accelerator semiconductor circuit. The GEMM dataflow accelerator semiconductor circuit may include a memory bank, a peripheral lookup table stored in the memory bank, and a first vector buffer configured to store a first vector that is used as a row address into the lookup table. The GEMM dataflow accelerator semiconductor circuit may further include a second vector buffer configured to store a second vector that is used as a column address into the lookup table. The GEMM dataflow accelerator semiconductor circuit may further include one or more lookup table buffers configured to receive one or more lookup table entries. In some embodiments, the second vector buffer is configured to stream the second vector to the one or more lookup table buffers, and the one or more lookup table buffers are configured to store the one or more lookup table entries from the lookup table. In some embodiments, the one or more lookup table buffers are configured to determine a product of the first vector and the second vector without performing a multiply operation.

In some embodiments, the product is a first product, and the GEMM circuit further includes one or more adders configured to sum the first product and a second product, and an output buffer configured to store a result of the sum of the first product and the second product. In some embodiments, the one or more lookup table buffers are configured to determine the first product using a value of the first vector and a value of the second vector as a column address and a row address, respectively, into the lookup table, without performing the multiply operation. In some embodiments, the one or more lookup table buffers are configured to determine the second product using a value of a third vector and a value of a fourth vector as a column address and a row address, respectively, into the lookup table, without performing the multiply operation.

In some embodiments, the memory bank, the peripheral lookup table, the first vector buffer, the one or more lookup table buffers, and the second vector buffer form a hierarchical lookup architecture to reduce latency. In some embodiments, the GEMM dataflow accelerator semiconductor circuit further includes a plurality of lookup table buffers including the one or more lookup table buffers. In some embodiments, the plurality of lookup table buffers are configured to store a corresponding plurality of matrix vectors to determine a plurality of products of the plurality of matrix vectors without accessing the lookup table stored in the memory bank, and without performing the multiply operation.

In some embodiments, the GEMM dataflow accelerator semiconductor circuit further includes a peripheral array of smart bank units. In some embodiments, the peripheral array of smart bank units are configured to form a pipelined dataflow chain in which partial output data from one smart bank unit from among the array of smart bank units is fed into another smart bank unit from among the array of smart bank units for data accumulation.

In some embodiments, each of the smart bank units includes the memory bank, the lookup table, the plurality of lookup table buffers, one or more adders, and an output buffer. In some embodiments, a first smart bank unit from among the plurality of smart bank units is configured to output the product to a second smart bank unit that is adjacent to the first smart bank unit. In some embodiments, the second smart bank unit is configured to store the product received from the first smart bank unit.

In some embodiments, the product is a first product, and the second smart bank unit is configured to receive a third vector from the memory bank in the streaming fashion. In some embodiments, the one or more lookup table buffers of the second smart bank unit are configured to determine a second product based on the third vector using the lookup table without performing the multiply operation. In some embodiments, the one or more adders of the second smart bank unit are configured to calculate a sum of the first product and the second product. In some embodiments, the output buffer of the second smart bank unit is configured to store the sum of the first product and the second product.

In some embodiments, the second smart bank unit is configured to output the sum of the first product and the second product to a third smart bank unit from among the peripheral array of smart bank units. In some embodiments, the third smart bank unit is adjacent to the second smart bank unit. In some embodiments, the third smart bank unit is configured to store the sum.

In some embodiments, the peripheral array of smart bank units is a systolic array that is configured to propagate partial sums in a serpentine fashion. In some embodiments, the peripheral array of smart bank units is configured to receive a plurality of input matrix vectors in a streaming fashion, and to propagate the plurality of input matrix vectors in a direction that is perpendicular to a data flow direction of the partial sums.

In some embodiments, the memory bank is a DRAM memory bank, the circuit further includes a near-DRAM-processing dataflow (NDP-DF) accelerator unit die including a plurality of channels. In some embodiments, each of the channels includes the peripheral array of smart bank units arranged in a serpentine fashion. In some embodiments, each of the smart bank units includes the DRAM bank, the lookup table, the plurality of lookup table buffers, the one or more adders, and the output buffer.

In some embodiments, the NDP-DF accelerator unit die is one of a plurality of NDP-DF accelerator unit dies that are stacked one atop another. In some embodiments, the GEMM circuit further includes a passive silicon interposer, a processor disposed on the passive silicon interposer, and a base die disposed on the passive silicon interposer adjacent to the processor. In some embodiments, the plurality of NDP-DF accelerator unit dies are stacked atop the base die.

In some embodiments, the GEMM circuit further includes one or more through silicon vias (TSVs) disposed through the plurality of NDP-DF accelerator unit dies and the base die. In some embodiments, the one or more TSVs are configured to interconnect the plurality of NDP-DF accelerator unit dies with the base die, and the base die with the processor. In some embodiments, the plurality of NDP-DF accelerator unit dies and the base die are configured to offload computation from the processor.

In some embodiments, the GEMM dataflow accelerator semiconductor circuit further includes a passive silicon interposer, a controller disposed on the passive silicon interposer, and a base die disposed on the passive silicon interposer adjacent to the controller. In some embodiments, the plurality of NDP-DF accelerator unit dies are stacked atop the base die.

In some embodiments, the GEMM dataflow accelerator semiconductor circuit further includes one or more through silicon vias (TSVs) disposed through the plurality of NDP-DF accelerator unit dies and the base die. In some embodiments, the one or more TSVs are configured to interconnect the plurality of NDP-DF accelerator unit dies with the base die, and the base die with the controller. In some embodiments, the plurality of NDP-DF accelerator unit dies and the base die are configured to offload computation from a host that is separate from the tensor computation dataflow accelerator semiconductor circuit. In some embodiments, the plurality of stacked NDP-DF accelerator unit dies and the base die are configured to process the partial output data in parallel.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

The following discussion is intended to provide a brief, general description of a suitable machine or machines in which certain aspects of the inventive concept can be implemented. Typically, the machine or machines include a system bus to which is attached processors, memory, e.g., RAM, ROM, or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the present inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the inventive concept with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms can reference the same or different embodiments that are combinable into other embodiments.

Embodiments of the inventive concept may include a non-transitory machine-readable medium comprising instructions executable by one or more processors, the instructions comprising instructions to perform the elements of the inventive concepts as described herein.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

What is claimed is:

1. A system, comprising:
   a memory;
   a lookup data structure stored in the memory;
   a first vector buffer configured to store a first vector that is used as a first address into the lookup data structure; and
   a second vector buffer configured to store a second vector that is used as a second address into the lookup data structure;
   wherein the lookup data structure is configured to provide a result based on a lookup operation, the result being generated based on a computation of the first vector and the second vector.

2. The system of claim 1, further comprising one or more lookup data structure buffers configured to receive one or more lookup data structure entries from the lookup data structure, and to determine a product of the first vector and the second vector based at least in part on the one or more lookup data structure entries.

3. The system of claim 2, wherein the one or more lookup data structure buffers are configured to store the one or more lookup data structure entries from the lookup data structure, and wherein the second vector buffer is configured to stream the second vector to the one or more lookup data structure buffers.

4. The system of claim 2, wherein the product is a first product, the circuit further comprising:
   one or more adders configured to sum the first product and a second product; and
   an output buffer configured to store a result of the sum of the first product and the second product.

5. The system of claim 4, wherein the one or more lookup data structure buffers are configured to determine the second product using a value of a third vector as the second address and a value of a fourth vector as the first address, into the lookup data structure.

6. The system of claim 2, wherein the one or more lookup data structure buffers are configured to determine the product using a value of the first vector as the second address and a value of the second vector as the first address, into the lookup data structure.

7. The system of claim 2, wherein the memory, the lookup data structure, the first vector buffer, the one or more lookup data structure buffers, and the second vector buffer are configured to reduce latency.

8. The system of claim 2, wherein the one or more lookup data structure buffers are configured to store one or more vectors to determine one or more products of the one or more vectors.

9. The system of claim 2, further comprising one or more bank units.

10. The system of claim 9, wherein, the one or more bank units are configured to form a pipelined dataflow chain in which partial output data from one bank unit from among the one or more bank units is fed into another bank unit from among the one or more bank units for data accumulation.

11. The system of claim 9, wherein a first bank unit from among the one or more bank units is configured to output the product to a second bank unit.

12. The system of claim 11, wherein the second bank unit is configured to store the product received from the first bank unit.

13. The system of claim 12, wherein:
the product is a first product;
the second bank unit is configured to receive a third vector from the memory in a streaming fashion;
the one or more lookup data structure buffers of the second bank unit are configured to determine a second product based on the third vector using the lookup data structure; and
an output buffer of the second bank unit is configured to store a sum of the first product and the second product.

14. The system of claim 9, wherein:
the one or more bank units is a systolic array that is configured to propagate partial sums; and
the one or more bank units is configured to receive one or more input matrix vectors in a streaming fashion, and to propagate the one or more input matrix vectors in a direction that is different from a data flow direction of the partial sums.

15. The system of claim 14, wherein the memory is a DRAM memory, the system further comprising:
a near-DRAM-processing dataflow (NDP-DF) accelerator unit die including one or more channels, wherein:
the one or more channels include the one or more bank units; and
the one or more bank units include the DRAM, the lookup data structure and the one or more lookup data structure buffers.

16. The system of claim 15, wherein the NDP-DF accelerator unit die is one of a plurality of NDP-DF accelerator unit dies that are stacked one atop another.

17. A memory device, comprising:
a lookup table;
a first vector buffer configured to store a first vector that is used as a row address into the lookup table;
a second vector buffer configured to store a second vector that is used as a column address into the lookup table; and
one or more lookup table buffers configured to receive one or more lookup table entries from the lookup table, and to determine a product of the first vector and the second vector based at least in part on the one or more lookup table entries.

18. The device of claim 17, further comprising one or more bank units configured to form a pipelined dataflow chain in which partial output data from one bank unit from among the one or more bank units is fed into another bank unit from among the one or more bank units for data accumulation, wherein:
the product is a first product;
the second bank unit is configured to receive a third vector in a streaming fashion;
the one or more lookup table buffers are configured to determine a second product based on the third vector using the lookup table; and
an output buffer is configured to store a sum of the first product and the second product.

19. The device of claim 18, further comprising a near-DRAM-processing dataflow (NDP-DF) accelerator unit die including one or more channels, wherein:
the one or more bank units is a systolic array that is configured to propagate partial sums;
the one or more bank units is configured to receive one or more input matrix vectors in a streaming fashion, and to propagate the one or more input matrix vectors in a direction that is different from a data flow direction of the partial sums;
the one or more channels include the one or more bank units; and
the one or more bank units include the lookup table and the one or more lookup table buffers.

20. A dataflow accelerator method, comprising:
storing a lookup table stored in a memory;
storing, by a first vector buffer, a first vector that is used as a row address into the lookup table;
storing, by a second vector buffer, a second vector that is used as a column address into the lookup table;
receiving, by one or more lookup table buffers, one or more lookup table entries from the lookup table; and
determining, by the one or more lookup table buffers, a product of the first vector and the second vector based at least in part on the one or more lookup table entries.

* * * * *